United States Patent
Horikawa et al.

(10) Patent No.: US 8,456,734 B2
(45) Date of Patent: Jun. 4, 2013

(54) WAVELENGTH CONVERSION LASER LIGHT SOURCE AND IMAGE DISPLAY DEVICE

(75) Inventors: Nobuyuki Horikawa, Kyoto (JP); Koichi Kusukame, Osaka (JP); Tomoya Sugita, Nara (JP); Hiroyuki Furuya, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/380,340

(22) PCT Filed: Apr. 20, 2011

(86) PCT No.: PCT/JP2011/002314
§ 371 (c)(1),
(2), (4) Date: Dec. 22, 2011

(87) PCT Pub. No.: WO2011/132414
PCT Pub. Date: Oct. 27, 2011

(65) Prior Publication Data
US 2012/0099184 A1    Apr. 26, 2012

(30) Foreign Application Priority Data
Apr. 23, 2010 (JP) ................................. 2010-099469

(51) Int. Cl.
*G02F 1/37* (2006.01)

(52) U.S. Cl.
USPC ........................................... 359/328; 372/22

(58) Field of Classification Search
USPC ................. 359/326–332; 372/21–22
See application file for complete search history.

(56) References Cited

U.S. PATENT DOCUMENTS

| 5,315,433 A | 5/1994 | Okazaki et al. |
| 5,432,807 A | 7/1995 | Okazaki et al. |
| 5,588,014 A | 12/1996 | Okazaki et al. |
| 5,652,757 A | 7/1997 | Okazaki et al. |
| 5,802,086 A * | 9/1998 | Hargis et al. ............... 372/22 |
| 5,940,419 A * | 8/1999 | Xie ............................... 372/22 |
| 6,031,853 A * | 2/2000 | Greene et al. ............... 372/22 |
| 6,175,578 B1 | 1/2001 | Ito |
| 7,433,373 B2 * | 10/2008 | Huang et al. ............... 372/10 |
| 7,760,773 B2 * | 7/2010 | Ma et al. ..................... 372/21 |

(Continued)

FOREIGN PATENT DOCUMENTS

| JP | 4-320078 | 11/1992 |
| JP | 5-145160 | 6/1993 |

(Continued)

OTHER PUBLICATIONS

International Search Report issued May 24, 2011 in International (PCT) Application No. PCT/JP2011/002314.

*Primary Examiner* — Daniel Petkovsek
(74) *Attorney, Agent, or Firm* — Wenderoth, Lind & Ponack, L.L.P.

(57) ABSTRACT

A wavelength conversion laser light source having: a laser medium which generates a fundamental wave light; a laser resonator for causing laser oscillation of the fundamental wave light; a wavelength convertor which is provided with a wavelength converting region to convert the fundamental wave light under the laser oscillation by means of the laser resonator into converted light of a different wavelength; and an excitation laser light source for exciting the laser medium, wherein the laser resonator has at least one reflecting surface which reflects the fundamental wave, and a first reflecting element which is provided on an end surface of the wavelength convertor to reflect the fundamental wave light; the wavelength converting region is situated between the at least one reflecting surface and the first reflecting element; the wavelength convertor has a periodic first polarization reversal structure formed in the wavelength converting region, and a non-converting region formed between the first reflecting element and the wavelength converting region; and the non-converting region does not convert the fundamental wave light into the converted light.

9 Claims, 17 Drawing Sheets

U.S. PATENT DOCUMENTS

| | | | |
|---|---|---|---|
| 7,907,646 B2 * | 3/2011 | Mizuuchi et al. | 372/21 |
| 8,254,415 B2 * | 8/2012 | Mizuuchi et al. | 372/5 |
| 2010/0238959 A1 * | 9/2010 | Yokoyama et al. | 372/22 |
| 2011/0255149 A1 | 10/2011 | Kusukame et al. | |

FOREIGN PATENT DOCUMENTS

| | | |
|---|---|---|
| JP | 5-232537 | 9/1993 |
| JP | 5-289137 | 11/1993 |
| JP | 6-188500 | 7/1994 |
| JP | 6-324371 | 11/1994 |
| JP | 9-127567 | 5/1997 |
| JP | 2000-183433 | 6/2000 |
| JP | 2001-210895 | 8/2001 |
| JP | 2002-162658 | 6/2002 |
| JP | 2004-125943 | 4/2004 |
| JP | 2006-330661 | 12/2006 |
| JP | 2008-140919 | 6/2008 |
| JP | 2009-139578 | 6/2009 |
| WO | 2011/048795 | 4/2011 |

* cited by examiner

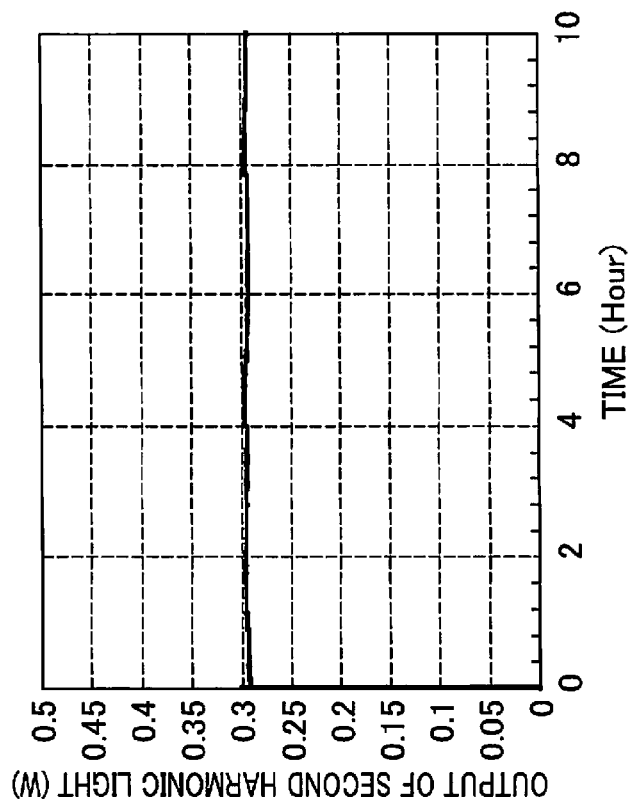
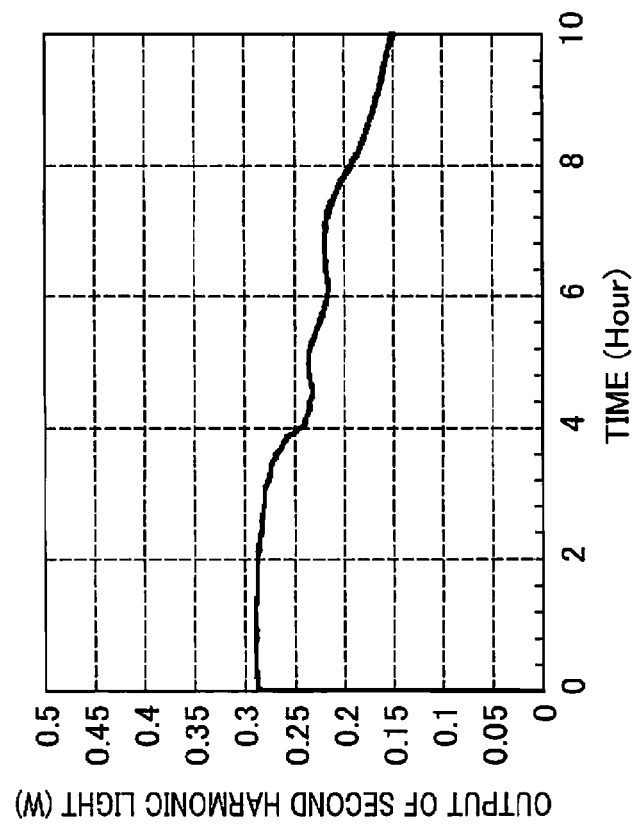

WAVELENGTH CONVERSION LASER LIGHT SOURCE AND IMAGE DISPLAY DEVICE

TECHNICAL FIELD

The present invention is related to a wavelength conversion laser light source and an image display device.

BACKGROUND OF THE INVENTION

A laser light source is widely used as a built-in device incorporated into industrial devices or domestic devices. A semiconductor laser diode or a solid-state laser light source is exemplified as the laser light source. A wavelength conversion laser light source is exemplified as another laser light source to obtain laser beam of a wavelength which is hardly obtained by means of direct oscillation by the semiconductor laser diode or the solid-state laser light source.

A wavelength conversion laser light source typically comprises a wavelength convertor. The wavelength conversion laser light source converts the fundamental wave laser beam (hereinafter, called "fundamental wave light"), which is incident on a wavelength convertor, into a frequency of laser beam by means of a Second Harmonic Generation element (SHG element), which generates light (called "second harmonic light" hereinafter) having twice as high as a frequency of the fundamental wave light. Alternatively, a wavelength conversion laser light source uses a Sum Frequency Generation (SFG) element, which generates light having a frequency that is a sum of two frequencies (sum frequency) of light input to a wavelength convertor, for the conversion into the frequency of the laser beam. As a result of the conversion into the frequency of the laser beam by means of a non-linear optical effect such as SHG or SFG, laser beam having a converted wavelength is output.

One of known wavelength conversion laser light source s comprises a resonator having a pair of reflecting mirrors, and a laser medium and a wavelength convertor which are situated between the paired reflective mirrors.

FIG. 16 is a schematic view of a conventional wavelength conversion laser light source. The conventional wavelength conversion laser light source is described with reference to FIG. 16.

The conventional wavelength conversion laser light source 900 has a solid laser medium 910, a wavelength convertor 920, a concave lens 930 and a dielectric multi-layer film 940. The dielectric multi-layer film 940 has high reflectivity for the fundamental wave light FL and reflectivity for the second harmonic light CL. The concave lens 930 includes a dielectric multi-layer film which has high reflectivity for the fundamental wave light FL and low reflectivity for the second harmonic light CL. Orientation of the crystals in the wavelength convertor 920, which is formed from non-linear optical crystals, and a period of the polarization reversal structure are controlled to match phases of the fundamental wave light FL and the second harmonic light CL with each other.

The concave lens 930 and the dielectric multi-layer film 940 operate as a resonator. The fundamental wave light FL inside the resonator is converted into the second harmonic light CL by the wavelength convertor 920. The second harmonic light CL, which is generated inside the resonator, is output outside the resonator via the end surface of the wavelength convertor 920.

If a cross-sectional area of the beam in the wavelength convertor of the wavelength conversion laser light source becomes small, conversion efficiency from an input power to the second harmonic wave increases. Patent Documents 1 and 2 propose forming a beam waist in the wavelength convertor to achieve efficient wavelength conversion.

According to Patent Documents 1 and 2, a reflecting mirror having a curved surface of a prescribed curvature is situated near the laser medium. A reflective coating layer which reflects the fundamental wave light with high reflectivity is formed on an end surface of the wavelength convertor. The reflecting mirror and the reflective coating layer operate as a resonator. The beam waist is formed on the end surface of the wavelength convertor. The wavelength conversion becomes efficient because a cross-sectional area of the fundamental wave light becomes small in the wavelength convertor.

The compact and inexpensive wavelength conversion laser light source disclosed in Patent Document 1 achieves high conversion efficiency. The wavelength conversion laser light source disclosed in Patent Document 2 radiates heat of the solid-state laser toward the SHG element to obtain stable output. However, these conventional technologies do not address issues about stabilization of the resonator.

Patent Document 1: JP H5-145160 A
Patent Document 2: JP 2000-183433 A

SUMMARY OF THE INVENTION

It is an object of the present invention to provide a wavelength conversion laser light source which has high wavelength conversion efficiency and produces a stable output.

The wavelength conversion laser light source according to one aspect of the present invention comprises: a laser medium configured to generate fundamental wave light; a laser resonator configured to cause laser oscillation of the fundamental wave light; a wavelength convertor including a wavelength converting region to convert the fundamental wave light under the laser oscillation by means of the laser resonator into converted light of a different wavelength; and an excitation laser light source configured to excite the laser medium, wherein the laser resonator includes at least one reflecting surface which reflects the fundamental wave, and a first reflecting element which is provided on an end surface of the wavelength convertor to reflect the fundamental wave light; the wavelength converting region is situated between the at least one reflecting surface and the first reflecting element; the wavelength convertor includes a periodic first polarization reversal structure formed in the wavelength converting region, and a non-converting region formed between the first reflecting element and the wavelength converting region; and the non-converting region does not convert the fundamental wave light into the converted light.

An image display device according to another aspect of the present invention comprises: a laser light source configured to emit laser light of at least one hue of red, green and blue; a spatial light modulator configured to modulate the laser light emitted from the laser light source; and an optical system configured to guide the laser light emitted from the laser light source to the spatial light modulator, wherein the laser light source includes the aforementioned wavelength conversion laser light source.

BRIEF DESCRIPTION OF THE DRAWINGS

FIG. 2A is a graph schematically showing temporal change in output of second harmonic light which is emitted from a typical wavelength conversion laser light source.

FIG. 2B is a graph schematically showing temporal change in output of second harmonic light which is emitted from the wavelength conversion laser light source shown in FIG. 1.

DETAILED DESCRIPTION OF THE INVENTION

Figure 1:
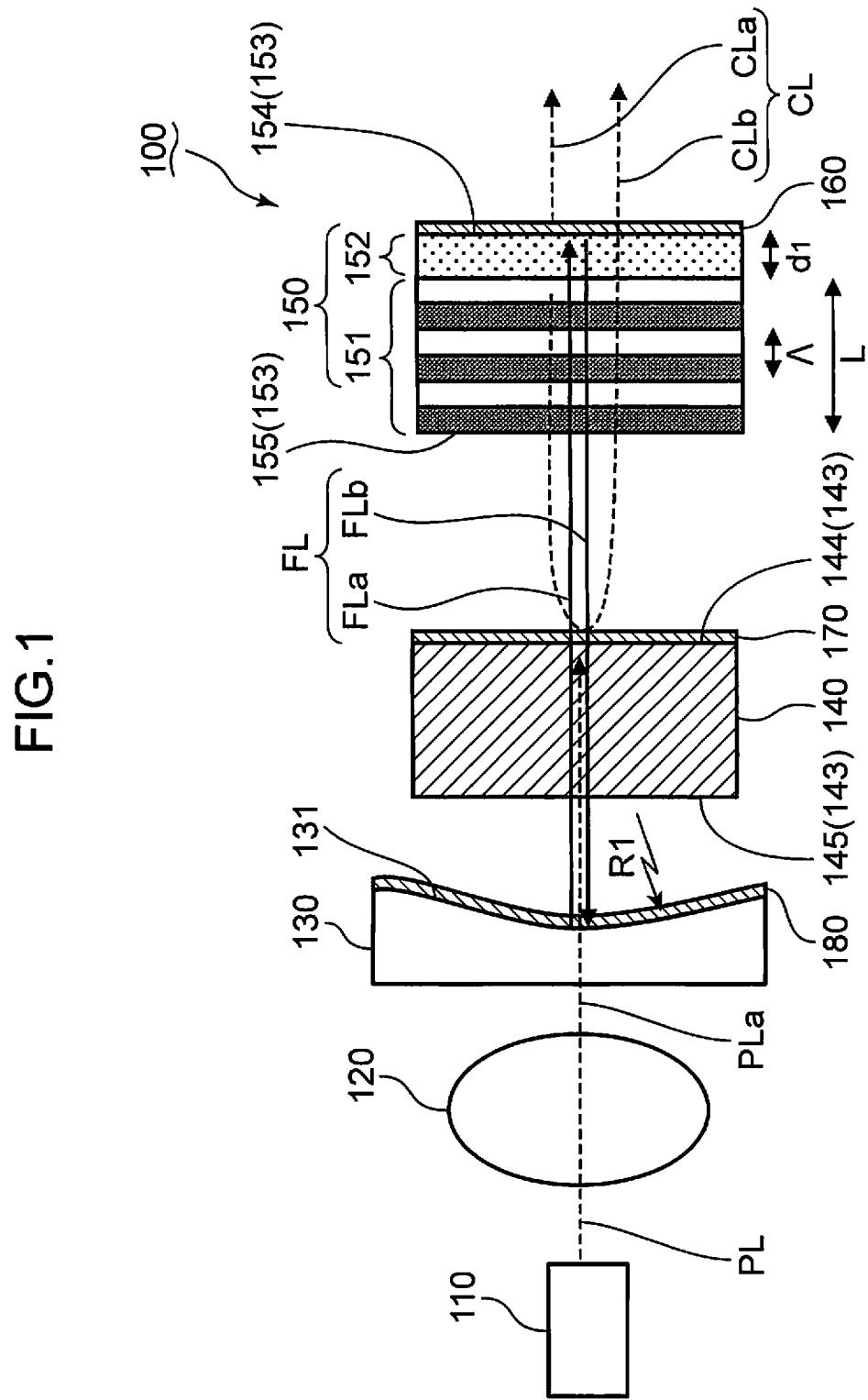
FIG. 1 is a schematic view of a wavelength conversion laser light source according to the first embodiment.

A wavelength conversion laser and an image display device according to one embodiment are described hereinafter with reference to the drawings. In the drawings, the same reference numerals are assigned to constituent elements which perform the same or similar actions or operations. In order to avoid redundant descriptions, repetitive explanations are omitted as appropriate. In order to facilitate to make a series of the principles of the embodiments understood, constituent elements in the drawings are schematically depicted. Consequently, shapes of the constituent elements shown in the drawings are also schematic and do not limit in any way the principles of the following embodiments.

(Problems of Wavelength Conversion Laser Light Source)

Figure 16:
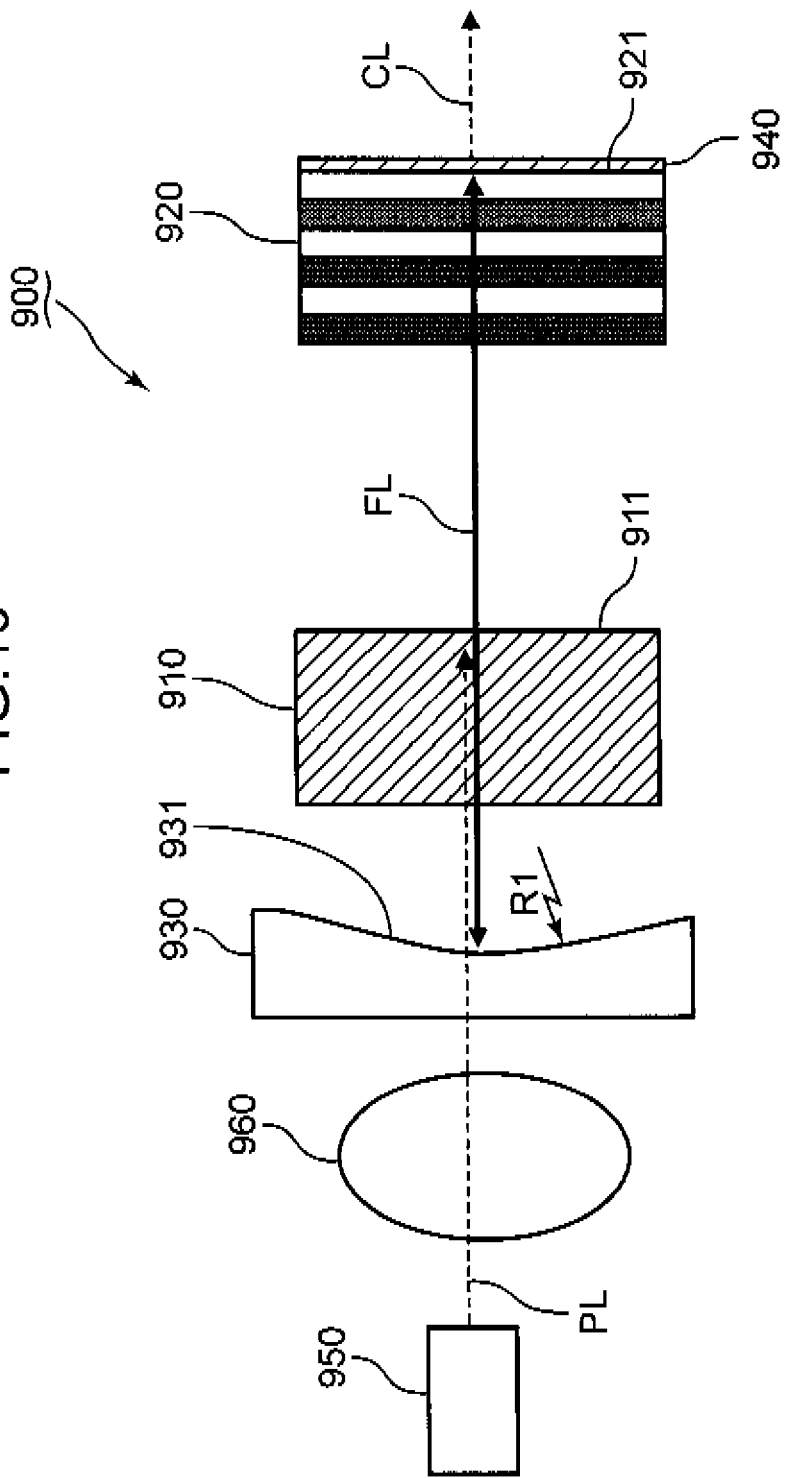
FIG. 16 is a schematic view of a conventional wavelength conversion laser light source.
Figure 17:
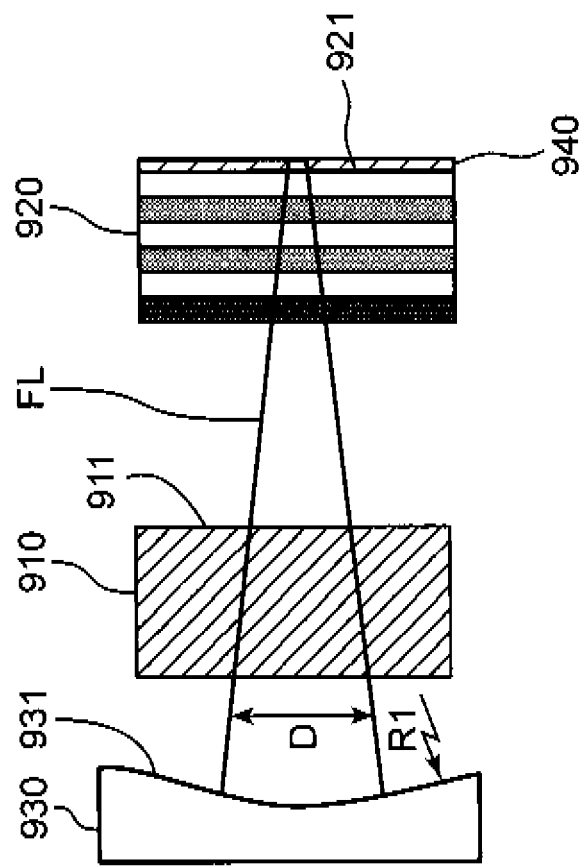
FIG. 17 is a schematic view showing a size of fundamental wave light in a resonator.

FIG. 16 is a schematic view of the aforementioned conventional wavelength conversion laser light source 900. FIG. 17 is a schematic view showing a size of the fundamental wave light FL in the resonator. The conventional wavelength conversion laser light source 900 is described with reference to FIGS. 16 and 17.

As described above, the conventional wavelength conversion laser light source 900 shown in FIG. 16 comprises the solid laser medium 910, the wavelength convertor 920, the concave lens 930 and the dielectric multi-layer film 940. The wavelength conversion laser light source 900 comprises a semiconductor laser diode (called an "excitation LD 950" hereinafter) which generates excitation laser light PL, and a condensing lens 960 which condenses the excited laser light PL. The concave lens 930 includes a concave surface 931 with a curvature of R1. The solid laser medium 910 includes an emission end surface 911 from which fundamental wave light FL is emitted. The wavelength convertor 920 includes an emission end surface 921 from which second harmonic light CL is emitted. In FIG. 17, the beam diameter of the fundamental wave light FL is expressed by using the symbol "D".

A periodic polarization reversal structure is formed over the whole of the wavelength convertor 920. The polarization reversal structure matches a phase of the fundamental wave light FL with a phase of the second harmonic light CL.

As described above, the dielectric multi-layer film 940 is formed on the emission end surface 921 of the wavelength convertor 920. The dielectric multi-layer film 940 has high reflectivity for the fundamental wave light FL and low reflectivity for the second harmonic light CL. The dielectric multi-layer film is also formed on the concave surface 931 of the concave lens 930. The dielectric multi-layer film formed on the concave surface 931 of the concave lens 930 has high reflectivity for the fundamental wave light FL. Consequently, the concave surface 931 of the concave lens 930 and the dielectric multi-layer film 940 formed on the emission end surface 921 of the wavelength convertor 920 function as a resonator for the fundamental wave light FL.

The excitation laser light PL emitted from the excitation LD 950 is condensed by the condensing lens 960. The condensed excitation laser light PL is incident on the solid laser medium 910 to excite the solid laser medium 910. For example, the solid laser medium 910 excited spontaneously emits light having a wavelength of 1064 nm. The fundamental wave light FL resonates inside the resonator, which is formed by the concave surface 931 of the concave lens 930 and the dielectric multi-layer film 940 formed on the emission end surface 921 of the wavelength convertor 920, so as to cause laser oscillation of the fundamental wave light FL.

The dielectric multi-layer film 940, which is used as one of reflecting surfaces of the resonator, is formed on the emission end surface 921 of the wavelength convertor 920. As shown in FIG. 17, the fundamental wave light FL is condensed inside the wavelength convertor 920. Therefore, the conversion efficiency from the fundamental wave light FL to the second harmonic light CL is increased. Consequently, the second harmonic light CL is efficiently emitted outside the resonator.

The present inventors figured out that the conversion efficiency from the fundamental wave light FL to the second harmonic light CL by means of the resonator including the dielectric multi-layer film 940 formed on the emission end surface 921 of the wavelength convertor 920 declined over time. The inventors also figured out that this temporal decline in the conversion efficiency from the fundamental wave light FL to the second harmonic light CL was caused by partial change in refractive index of the wavelength convertor 920 resulting from concentration of a photoelectric field nearby the emission end surface 921 of the wavelength convertor 920.

A series of principles of the following embodiments preferably resolve the problems of the conventional wavelength laser light source, which were newly figured out by the present inventors.

First Embodiment

A wavelength conversion laser light source according to the first embodiment is mainly characterized by a "non-converting region" which is formed on an emission end surface side of the wavelength convertor. The term "non-converting region" means a region which has little contribution to the wavelength conversion from the fundamental wave light to the second harmonic light.

(Structure of Wavelength Conversion Laser Light Source)

FIG. 1 is a schematic view of the wavelength conversion laser light source according to the first embodiment. The wavelength conversion laser light source is described with reference to FIG. 1.

The wavelength conversion laser light source 100 according to the present embodiment comprises: an excitation laser light source 110 which generates excitation laser light PL; a condensing lens 120 which condenses the excitation laser light PL; a concave lens 130 which includes a concave surface 131 formed with a curvature R1; a solid laser medium 140 which is excited by the excitation laser light PL from the excitation laser light source 110 to generate fundamental wave light FL; and a wavelength convertor 150 which converts the fundamental wave light FL into converted light, which is different in wavelength from the fundamental wave light FL. The wavelength convertor 150 comprises a wavelength converting region 151, in which the fundamental wave light FL is converted into the second harmonic light CL as the converted light, and a non-converting region 152 which does not contribute to the conversion from the fundamental wave light FL to the converted light. In the present embodiment, the solid laser medium 140 is exemplified as the laser medium.

The reference symbol "PLa" shown in FIG. 1 indicates an optical path of the excitation laser light PL. The reference symbols "FLa" and "FLb" shown in FIG. 1 indicate optical paths of the fundamental wave light FL. The reference symbols "CLa" and "CLb" shown in FIG. 1 indicate optical paths of the second harmonic light CL.

The wavelength convertor 150 includes end surfaces 153 across the optical propagation paths shown in FIG. 1 (the optical paths FLa, FLb, CLa, CLb). The end surfaces 153 of the wavelength convertor 150 include an emission end surface 154 from which the second harmonic light CL is emitted and an incident end surface 155 opposite to the emission end surface 154. The fundamental wave light FL is incident on the incident end surface 155. The emission end surface 154 is exemplified as the second emission end surface in the present embodiment.

The solid laser medium 140 includes end surfaces 143 across the optical propagation paths shown in FIG. 1 (the optical paths PLa, FLa, FLb). The end surfaces 143 of the solid laser medium 140 include an emission end surface 144 from which the fundamental wave light FL is emitted, and an incident end surface 145 on which the excitation laser light PL is incident. In the present embodiment, the emission end surface 144 is exemplified as the first emission end surface.

An AlGaAs type semiconductor laser (Laser Diode) is exemplified as the excitation laser light source 110. In the present embodiment, the excitation laser light source 110 causes the excitation laser light PL having a wavelength of approximately 808 nm.

Niobium-doped $YVO_4$ (hereinafter called "Nd:$YVO_4$") is exemplified as the solid laser medium 140. In the present embodiment, the solid laser medium 140 causes the fundamental wave light FL having a wavelength of approximately 1064 nm.

A convex lens is exemplified as the condensing lens 120. In the present embodiment, a planoconcave lens having a concave surface 131 formed with a curvature R1 of about 20 mm is used as the concave lens 130.

A non-linear optical crystal may be used as a wavelength convertor 150. Magnesium-doped lithium niobate (MgO:$LiNbO_3$) (hereinafter, called "MgLN") is exemplified as the non-linear optical crystal.

A periodic polarization reversal structure is formed in the wavelength converting region 151 (length L=0.5 mm). The polarization reversal structure formed in the wavelength converting region 151 has a polarization reversal period of $\Lambda(\cong 7$ μm). The polarization reversal structure formed in the wavelength converting region 151 matches a phase of the fundamental wave light FL with a phase of the second harmonic light CL. The polarization reversal structure in the wavelength converting region 151 is exemplified as the first polarization reversal structure in the present embodiment.

Unlike the wavelength converting region 151, no periodic polarization reversal structure is formed in the non-converting region 152 so that the region is single-polarized. The non-converting region 152 has a length $d_1$ ($d_1$=400 μm).

The wavelength conversion laser light source 100 also comprises a dielectric multi-layer film 160 which covers the emission end surface 154 of the wavelength convertor 150. The dielectric multi-layer film 160 has high reflectivity for the fundamental wave light FL and low reflectivity for the second harmonic light CL.

The wavelength conversion laser light source 100 also comprises a dielectric multi-layer film 170 configured to cover the emission end surface 144 of the solid laser medium 140. The dielectric multi-layer film 170 has low reflectivity for the fundamental wave light FL and high reflectivity for the second harmonic light CL.

The wavelength conversion laser light source 100 also comprises a dielectric multi-layer film 180 configured to cover the concave surface 131 of the concave lens 130. The dielectric multi-layer film 180 has high reflectivity for the fundamental wave light FL.

In the present embodiment, the dielectric multi-layer film 180, which is formed on the concave surface 131 of the concave lens 130, and the dielectric multi-layer film 160, which is formed on the emission end surface 154 of the wavelength convertor 150, function as a resonator to cause laser oscillation of the fundamental wave light FL. The dielectric multi-layer film 180 which reflects the fundamental wave light FL is exemplified as the at least one reflecting surface. The dielectric multi-layer film 160 which reflects the fundamental wave light FL is exemplified as the first reflecting element and the first reflective film.

(Operation of Wavelength Conversion Laser Light Source)

The operation of the wavelength conversion laser light source 100 is described with reference to FIG. 1.

The excitation laser light PL emitted from the excitation laser light source 110 is condensed by the condensing lens 120. Afterward, the excitation laser light PL is incident on the solid laser medium 140. Consequently, the solid laser medium 140 is excited and spontaneously emits light having a wavelength of 1064 nm. The spontaneously emitted light from the solid laser medium 140 resonates in the resonator formed by the dielectric multi-layer film 180 provided on the concave surface 131 of the concave lens 130 and the dielectric multi-layer film 160 formed on the emission end surface 154 of the wavelength convertor 150, which results in laser oscillation of the fundamental wave light FL.

The fundamental wave light FL, which resonates due to the dielectric multi-layer film 180 that is provided on the concave surface 131 of the concave lens 130 and the dielectric multi-layer film 160 that is formed on the emission end surface 154 of the wavelength convertor 150, is condensed by the concave surface of the concave lens 130, which has a curvature of R1, to form a beam waist nearby the emission end surface 154 of the wavelength convertor 150. Thus, a beam diameter of the fundamental wave light FL inside the wavelength convertor 150 is reduced whereas the conversion efficiency from the fundamental wave light FL to the second harmonic light CL increases.

The fundamental wave light FL which travels along the optical path FLa from the concave lens 130 toward the wavelength convertor 150 is converted into the second harmonic light CL by the wavelength converting region 151 of the wavelength convertor 150, which is situated between the dielectric multi-layer films 160, 180, and then emitted outside the resonator via the emission end surface 154 of the wavelength convertor 150 along the optical path CLa. On the other hand, the fundamental wave light FL which propagates along the optical path FLb from the wavelength convertor 150 toward the concave lens 130 is converted into second harmonic light CL by the wavelength convertor 150, and is then reflected toward the wavelength convertor 150 by the dielectric multi-layer film 170 formed on the emission end surface 144 of the solid laser medium 140. Afterward, the second harmonic light CL passes through the wavelength convertor 150 and is emitted outside the resonator (see optical path CLb in FIG. 1).

As described above, the wavelength conversion laser light source 100 according to the present embodiment comprises the non-converting region 152 which forms the emission end surface 154 of the wavelength convertor 150. Since the fundamental wave light FL is reflected by the dielectric multi-layer film 160 which covers the emission end surface 154 formed by the non-converting region 152 between the dielectric multi-layer film 160 and the wavelength converting region 151, it becomes less likely that the periodic polarizing reversal structure formed in the wavelength converting region 151 is deteriorated. Consequently, it becomes less likely that the conversion efficiency from the fundamental wave light FL to the second harmonic light CL is reduced.

The term "deterioration of the periodic polarization reversal structure" means apparent partial change in a period of the periodic polarization reversal structure which results from a change in refractive index inside the wavelength convertor 150. The partial change in the period of the periodic polarization reversal structure causes an offset from a designed period to decline a power of the second harmonic light CL.

(Effects of Non-Converting Region)

FIG. 2A is a graph schematically showing temporal changes in output of the second harmonic light CL emitted from the wavelength conversion laser light source 900 which is described with reference to FIG. 16. FIG. 2B is a graph schematically showing temporal changes in output of the second harmonic light CL emitted from the wavelength conversion laser light source 100 which is described with reference to FIG. 1. The temporal changes in output of the second harmonic light CL are described with reference to FIGS. 1 to 2B and FIG. 16.

The present inventors continuously drove the wavelength conversion laser light source 900 shown in FIG. 16 to investigate the output of the second harmonic light CL. As shown in FIG. 2A, it was observed that the output of the second harmonic light CL emitted from the wavelength conversion laser light source 900 after driving continuously for 10 hours became approximately half the output at the start of the continuous drive.

Likewise, the present inventors continuously drove the wavelength conversion laser light source 100 described with reference to FIG. 1 to investigate the output of the second harmonic light CL. As shown in FIG. 2B, little decline in output of the second harmonic light CL emitted from the wavelength conversion laser light source 100 was observed over the continuous drive for 10 hours.

It may be figured out from the results shown in FIGS. 2A and 2B that there is little deterioration in the periodic polarization reversal structure due to the non-converting region 152 provided on the side of the emission end surface 154 of the wavelength convertor 150. It may be figured out that there is little decline in output of the second harmonic light CL due to the non-converting region 152.

(Length Setting of Non-Converting Region)

In the present embodiment, the length $d_1$ of the non-converting region 152 (the length dimension in a direction along the optical propagation path) is set to 400 μm. Alternatively, if the wavelength convertor 150 converts the fundamental wave light FL to the second harmonic light CL having a wavelength width (full width at half maximum) of $\Delta\lambda_s$ nm as the converted light, the length $d_1$ of the non-converting region 152 may be set so as to satisfy the following relationship defined by Expression 1.

$$d_1 \leq 40 \ \mu m / \Delta\lambda_s \qquad \text{[Expression 1]}$$

If the relationship defined by Expression 1 is satisfied, it becomes less likely that the periodic polarization reversal structure is deteriorated and that the conversion efficiency from the fundamental wave light FL to the second harmonic light CL goes down. If the periodic polarization reversal structure formed in the wavelength converting region 151 has a period of Λ (μm), the length $d_1$ of the non-converting region 152 may be set so as to satisfy the following relationship defined by Expression 2.

$$d_1 \geq \Lambda \qquad \text{[Expression 2]}$$

If the aforementioned relationship defined by Expression 2 is satisfied, it becomes less likely that the periodic polarization reversal structure is deteriorated and that the conversion efficiency from the fundamental wave light FL to the second harmonic light CL goes down.

The length $d_1$ of the non-converting region 152 may be set so as to satisfy conditions combining the aforementioned relationships defined by Expressions 1 and 2 (in other words, $\Lambda \leq d_1 \leq 40 \ \mu m / \Delta\lambda_s$) to reduce losses in the resonator caused by the non-converting region 152 and to increase the fundamental wave light FL inside the resonator and the conversion efficiency from the fundamental wave light FL to second harmonic light CL.

The setting of the length $d_1$ of the aforementioned non-converting region 152 is described in more detail. In the following descriptions, the central wavelength of the second harmonic light CL is expressed by $\lambda_s$ nm. The wavelength width (full width at half maximum) of the second harmonic light CL is expressed by $\Delta\lambda_s$ nm. A phase difference between the wavelength "$\lambda_s - \Delta\lambda/2$" and the wavelength "$\lambda_s + \Delta\lambda/2$" at the emission end surface 154 of the wavelength convertor 150 is expressed by $\Delta\phi/\pi$ [rad].

Figure 3:
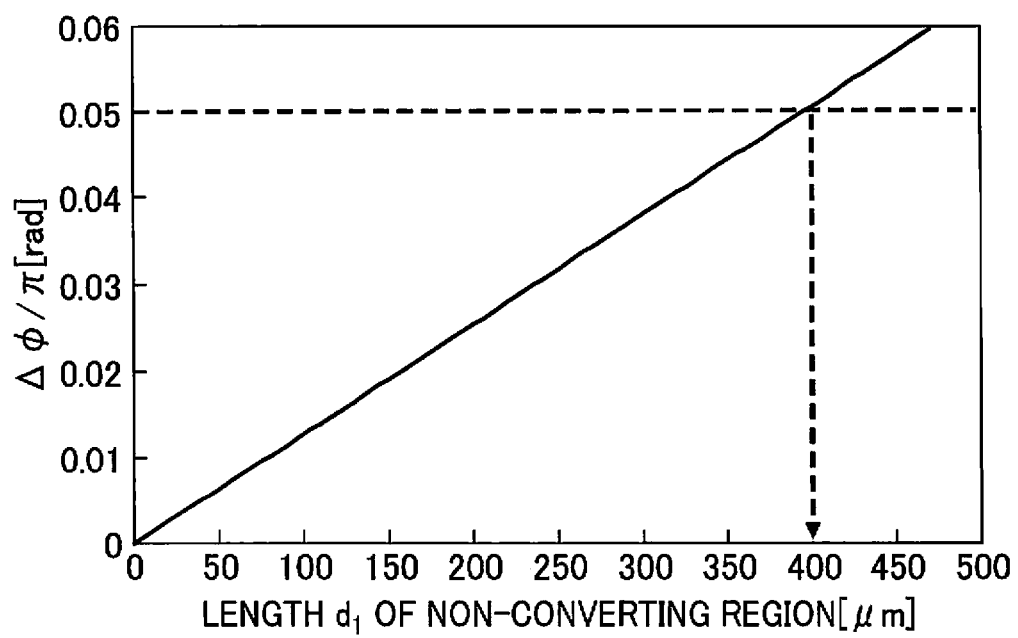
FIG. 3 is a graph schematically showing a relationship between a length $d_1$ of a non-converting region and a value of $\Delta\phi/\pi$ [rad] when $\Delta\lambda_s=0.1$ [nm].

FIG. 3 is a graph schematically showing a relationship between the length $d_1$ of the non-converting region 152 and the value of $\Delta\phi/\pi$ [rad] when $\Delta\lambda_s = 0.1$ [nm]. The relationship between the length $d_1$ of the non-converting region 152 and $\Delta\phi/\pi$ [rad] is described with reference to FIGS. 1 and 3.

If the length $d_1$ of the non-converting region 152 is "0" (in other words, if the wavelength converting region 151 is formed through the wavelength convertor 150 from the incident end surface 155 to the emission end surface 154), a phase of the second harmonic light CL becomes entirely uniform, from wavelength "$\lambda_s - \Delta\lambda/2$" through to wavelength "$\lambda_s + \Delta\lambda/2$", ($\Delta\phi/\pi = 0$). Under "$\Delta\phi/\pi = 0$", electric field intensity at the emission end surface 154 of the wavelength convertor 150 becomes greater, so that changes in refractive index occur nearby the emission end surface 154 of the wavelength convertor 150. The changes in refractive index nearby the emission end surface 154 of the wavelength convertor 150 deteriorate the periodic polarization reversal structure (apparent partial change in a period of the periodic polarization reversal structure). This deterioration in the periodic polarization reversal structure causes inefficient wavelength conversion from the fundamental wave light FL to the second harmonic light CL, which results in decreased output of the second harmonic light CL.

If the length $d_1$ of the non-converting region 152 is set to a long length, $\Delta\phi/\pi$ [rad] increases. Consequently, the electric field intensity at the emission end surface 154 of the wavelength convertor 150 falls. If the condition defined by "$d_1 \geq 40/\Delta\lambda_s$" is satisfied, $\Delta\phi/\pi$ becomes no less than 0.05 [rad], so that it becomes in particular less likely that the refractive index of the wavelength convertor 150 changes. Therefore, it becomes less likely that the output of the second harmonic light CL declines.

Even if the length $d_1$ of the non-converting region 152 is set to be longer than $\Lambda$ (a period of the periodic polarization reversal structure), a value of $\Delta\phi/\pi$ is obtained to effectively suppress reduction in the output of the second harmonic light CL and to moderate the changes in refractive index of the wavelength convertor 150. Consequently, it also becomes less likely that the output of the second harmonic light CL decreases. If the length $d_1$ of the non-converting region 152 is shortened, losses inside the resonator are decreased, which results in more efficient conversion from the fundamental wave light FL to the second harmonic light CL. Therefore, the non-converting region 152 may be set to a relatively short length $d_1$ to achieve higher "electrical-optical conversion efficiency".

An increase in the length $d_1$ of the non-converting region 152 results in an increase in loss inside the resonator. Therefore, the length $d_1$ of the non-converting region 152 is preferably set so that the increase in the resonator loss is no more than 0.4%. If the length $d_1$ of the non-converting region 152 is set to no more than 2000 μm, for example, the increase in the resonator loss becomes no more than 0.4%. From the aforementioned consideration, the period $\Lambda$ of the periodic polarization reversal structure formed in the wavelength converting region 151 and the length $d_1$ of the non-converting region 152 are preferably set so as to satisfy the following relationship defined in Expression 3. In the present embodiment, the period $\Lambda$ of the periodic polarization reversal structure formed in the wavelength converting region 151 is exemplified as the first polarization reversal period.

$$\Lambda \leq d_1 \leq 2000 \text{ μm} \quad \text{[Expression 3]}$$

In the present embodiment, the whole region of the non-converting region 152 is single-polarized, so that the fundamental wave light FL does not have to pass through a polarization wall (a boundary interface where the polarization switches), which results in decreased resonator losses. Due to the reduced resonator losses, the intensity of the fundamental wave light FL goes up to achieve high conversion efficiency.

In particular, if the length $d_1$ of the non-converting region 152 satisfies a relationship defined by "$\Lambda \leq d_1 < 40 \text{ μm}/\Delta\lambda$" and if the non-converting region 152 is single-polarized, the changes in refractive index of the wavelength convertor 150 are limited to one direction (monotonous increase or decrease). Therefore, the changes in refractive index become less influential on the transverse mode inside the resonator.

Second Embodiment

Figure 4:
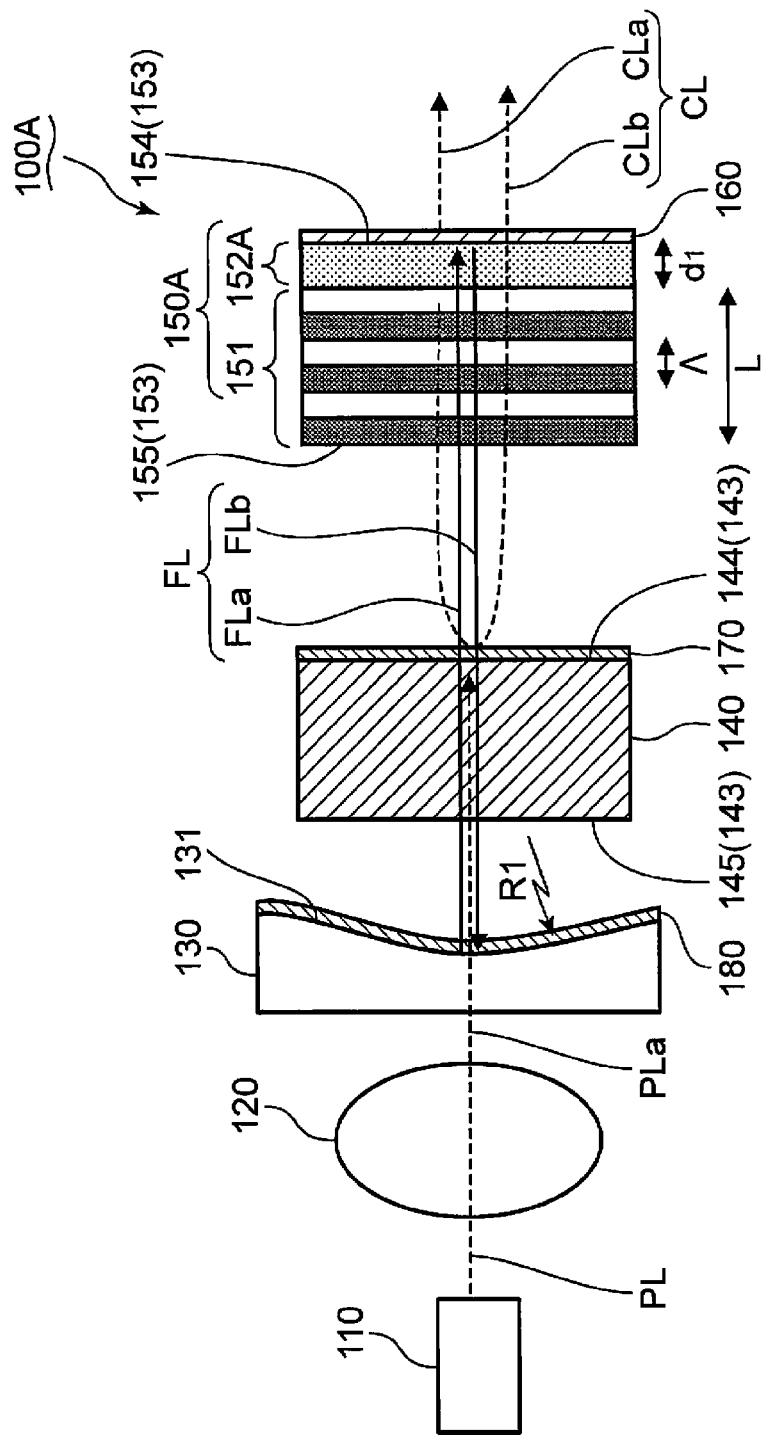
FIG. 4 is a schematic view of a wavelength conversion laser light source according to the second embodiment.

FIG. 4 is a schematic view of a wavelength conversion laser light source according to the second embodiment. The wavelength conversion laser light source according to the second embodiment is described with reference to FIG. 4.

The wavelength conversion laser light source 100A according to the present embodiment comprises a wavelength convertor 150A in addition to the excitation laser light source 110, the condensing lens 120, the concave lens 130, the solid laser medium 140 and the dielectric multi-layer films 160, 170, 180, like the wavelength conversion laser light source 100 described in the context of the first embodiment. The wavelength convertor 150A includes a non-converting region 152A in addition to the wavelength converting region 151 described in the context of the first embodiment. A polarization reversal structure which does not contribute to the conversion from the fundamental wave light FL to the second harmonic light CL is formed in the non-converting region 152A.

Figure 5:
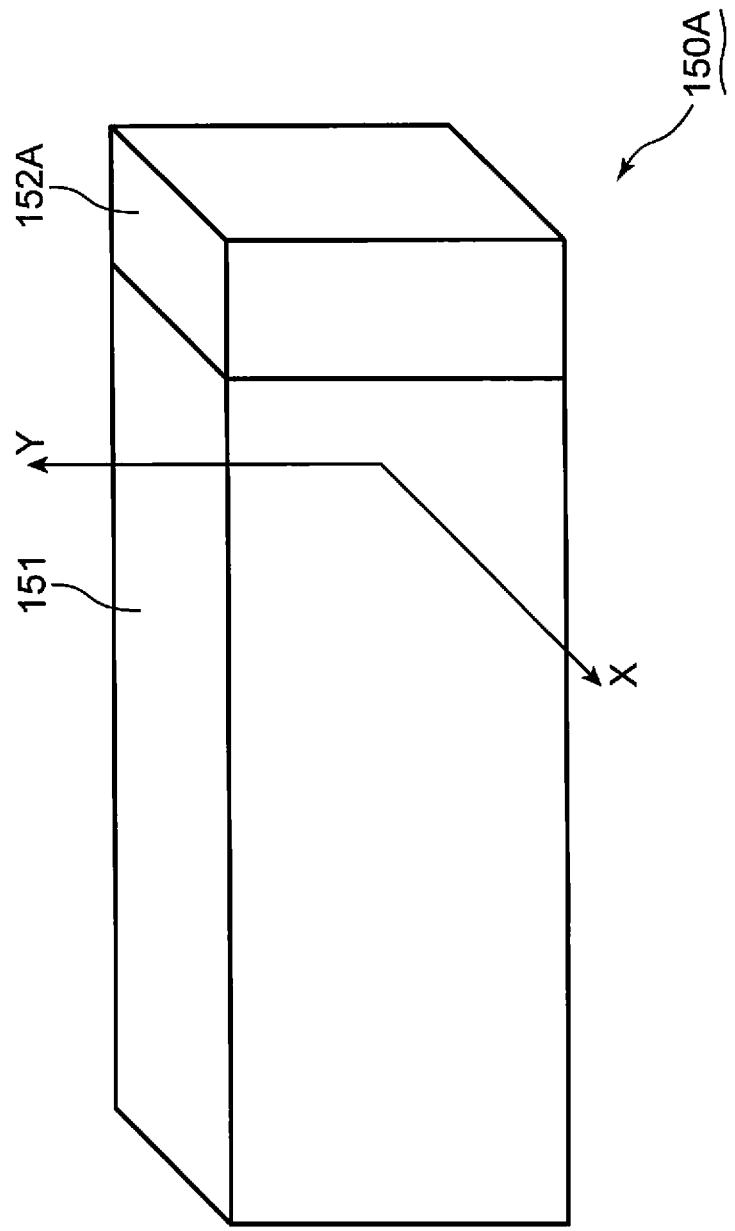
FIG. 5 is a schematic perspective view of a wavelength convertor of the wavelength conversion laser light source shown in FIG. 4.

FIG. 5 is a schematic perspective view of the wavelength convertor 150A. The wavelength convertor 150A is described with reference to FIGS. 4 and 5.

A periodic polarization reversal structure which reverses polarization in the Y direction in FIG. 5 is formed in the wavelength converting region 151. A polarization reversal structure which reverses the polarization in the perpendicular direction (X axis direction) to the polarization reversal direction of the wavelength conversion region 151 is formed in the non-converting region 152A. The term "formation of a polarization reversal structure which reverses polarization in the Y direction" means that the polarization reversing wall is a plane along the Y axis direction. The term "formation of a polarization reversal structure which reverses polarization in the X direction" means that the polarization reversing wall is a plane along the X axis direction. The polarization reversal structure formed in the non-converting region 152A does not have to be periodic. The polarization reversing wall formed in the non-converting region 152A may be inclined in a range of no less than 75 degrees and no more than 105 degrees with respect to the Y axis. Even with the polarization reversal structure in the non-converting region 152A which has a polarization reversing wall inclined in this range, similar effects are obtained as with the polarization reversal structure which reverses polarization in a direction perpendicular to the polarization reversing direction of the wavelength conversion region 151.

Third Embodiment

Figure 6:
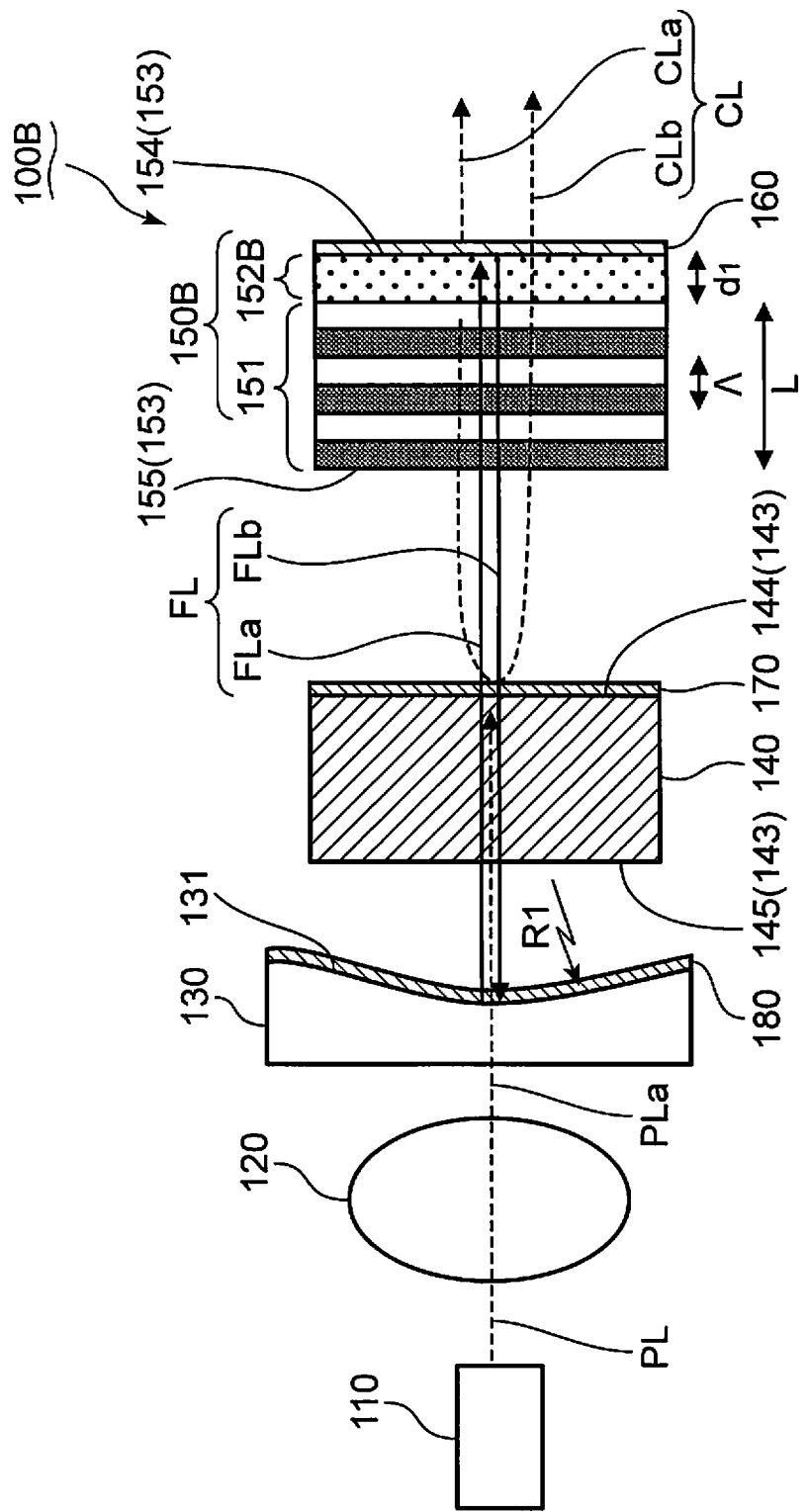
FIG. 6 is a schematic view of a wavelength conversion laser light source according to the third embodiment.

FIG. 6 is a schematic view of a wavelength conversion laser light source according to the third embodiment. The wavelength conversion laser light source according to the third embodiment is described with reference to FIG. 6.

The wavelength conversion laser light source 100B according to the present embodiment comprises a wavelength convertor 150B in addition to the excitation laser light source 110, the condensing lens 120, the concave lens 130, the solid laser medium 140 and the dielectric multi-layer films 160, 170, 180 like the wavelength conversion laser light source 100 described in the context of the first embodiment. The wavelength convertor 150B includes a non-converting region 152B in addition to the wavelength converting region 151 described in the context of the first embodiment. Like the wavelength converting region 151, a periodic polarization reversal structure is formed in the non-converting region 152B. The polarization reversal direction of the polarization reversal structure which is formed in the non-converting region 152B may be the same as the polarization reversal direction of the polarization reversal structure which is formed in the wavelength converting region 151. However, the period of the polarization reversal structure formed in the non-converting region 152B is different from the period of the polarization reversal structure formed in the wavelength converting region 151. In the present embodiment, the polarization reversal structure formed in the non-converting region 152B is exemplified as the second polarization reversal structure.

Preferably, the period of the polarization reversal structure formed in the non-converting region 152B is set to be ½n times (where n is a natural number) as long as the period of the polarization reversal structure formed in the wavelength conversion region 151. Therefore, the variations become less influential on the wavelength conversion from the fundamental wave light FL to the second harmonic light CL even if there are variations in dimension or characteristics of the non-converting region 152B during manufacturing process. In the present embodiment, the period of the polarization reversal structure formed in the non-converting region 152B is exemplified as the second polarization reversal period.

The period Λ of the periodic polarization reversal structure, which is formed in the wavelength converting region 151, and the length $d_1$ of the non-converting region 152B in the present embodiment are preferably set so as to satisfy the following relationship defined by Expression 4 on the basis of the consideration in the first embodiment.

$$2n\Lambda \leq d_1 \leq 2000 \text{ μm} \qquad \text{[Expression 4]}$$

The period of the polarization reversal structure formed in the non-converting region 152B may be m/4 times as long as the period of the polarization reversal structure formed in the wavelength converting region 151 (where m is an odd number of no less than 3). Alternatively, the period of the polarization reversal structure formed in the non-converting region 152B may be p/2 times as long as the period of the polarization reversal structure formed in the wavelength converting region 151 (where p is an odd number of no less than 3). Further alternatively, the period of the polarization reversal structure formed in the non-converting region 152B may be q times as long as the period of the polarization reversal structure formed in the wavelength converting region 151 (where q is a positive even number).

The present inventors created wavelength convertors under the following conditions to investigate effects of the non-converting region 152B when there are variations resulting from manufacturing process of the wavelength convertor.

Condition 1:
The polarization reversal period in the non-converting region 152B is ½n times as long as the polarization reversal period in the wavelength converting region 151 (where n is a natural number)

Condition 2:
The polarization reversal period in the non-converting region 152B is p/2 times or q times as long as the polarization reversal period in the wavelength converting region 151 (where p is an odd number no less than 3 and q is a positive even number).

Condition 3:
The polarization reversal period in the non-converting region 152B is m/4 times as long as the polarization reversal period in the wavelength converting region 151 (where m is an odd number no less than 3).

The effects of the non-converting region 152B when there are the variations caused by the manufacturing process of the wavelength convertor became the greatest under "Condition 3" and the smallest under "Condition 1" (Condition 3>Condition 2>Condition 1).

The longer the period of the periodic polarization reversal structure formed in the non-converting region 152B, the easier the manufacture of the non-converting region 152B and the lower the manufacturing costs of the wavelength convertor 150B. However, the greater difference between the polarization reversal period in the wavelength converting region 151 and the polarization reversal period in the non-converting region 152B makes it difficult to form a polarization reversal structure in an interface region between the wavelength converting region 151 and the non-converting region 152B. Therefore, the polarization reversal period in the non-converting region 152B is preferably no more than 7 times as long as the polarization reversal period in the wavelength converting region 151. If the period of the periodic polarization reversal in the non-converting region 152B is set to be no less than 1 μm and no more than 7 times as long as the polarization reversal period of the wavelength converting region 151, the polarization reversal structure in the interface region between the wavelength converting region 151 and the non-converting region 152B is facilitated to form in accordance with the design. Therefore, the wavelength convertor 150B may convert efficiently the optical wavelength.

The polarization reversal period in the non-converting region 152B may be substantially the same as the polarization reversal period in the wavelength converting region 151. The term "substantially the same" means that the polarization reversal period in the non-converting region 152B is set in a range of no less than 93.4% and no more than 107% of the polarization reversal period in the wavelength converting region 151. The above advantageous effects are obtained if the polarization reversal period in the non-converting region 152B is set within such a range.

Alternatively, the polarization reversal period in the non-converting region 152B may be set to be no less than 87.7% and no more than 114% of the polarization reversal period in the wavelength converting region 151. In this case, effects close to the aforementioned advantageous effects are also obtained.

(Material of Wavelength Convertor)

The wavelength converting region 151 and the non-converting regions 152, 152A, 152B of the wavelength convertors 150, 150A, 150B described in the context of the first to third embodiments may be formed of the same materials. Alternatively, the wavelength converting region 151 and the non-converting regions 152, 152A, 152B may be formed from different materials.

The wavelength converting region 151 of the wavelength convertors 150, 150A, 150B described in the context of the first to third embodiments is formed from MgLN. For example, the non-converting regions 152, 152A, 152B may be formed from lithium tantalate. The non-converting regions 152, 152A, 152B formed from lithium tantalate emit the high-power second harmonic light CL with little absorption of the fundamental wave light FL.

The lithium tantalate is exemplified as the material used in the non-converting regions 152, 152A, 152B, but another material may be used if the material has the same or close refractive index as or to the material used for the wavelength converting region 151. For example, $YVO_4$ (yttrium vanadate), $GVO_4$ (gadolinium vanadate) or $KNbO_3$ (potassium niobate) may be exemplified as other materials which may be used for the non-converting regions 152, 152A, 152B. The above advantageous effects may be obtained even if these crystal materials are used for the non-converting regions 152, 152A, 152B.

If the crystals used in the non-converting regions 152, 152A, 152B are different in refractive index from the crystals used in the wavelength converting region 151, the wavelength convertor 150, 150A, 150B may be additionally provided with a buffer film having an intermediate refractive index between the refractive indexes of the crystals used in the non-converting region 152, 152A, 152B and the wavelength converting region 151. The buffer film between the non-converting region 152, 152A, 152B and the wavelength converting region 151 appropriately reduces reflection at the interface between the non-converting region 152, 152A, 152B and the wavelength converting region 151. Therefore, it becomes less likely that the wavelength conversion efficiency goes down.

Fourth Embodiment

Figure 7:
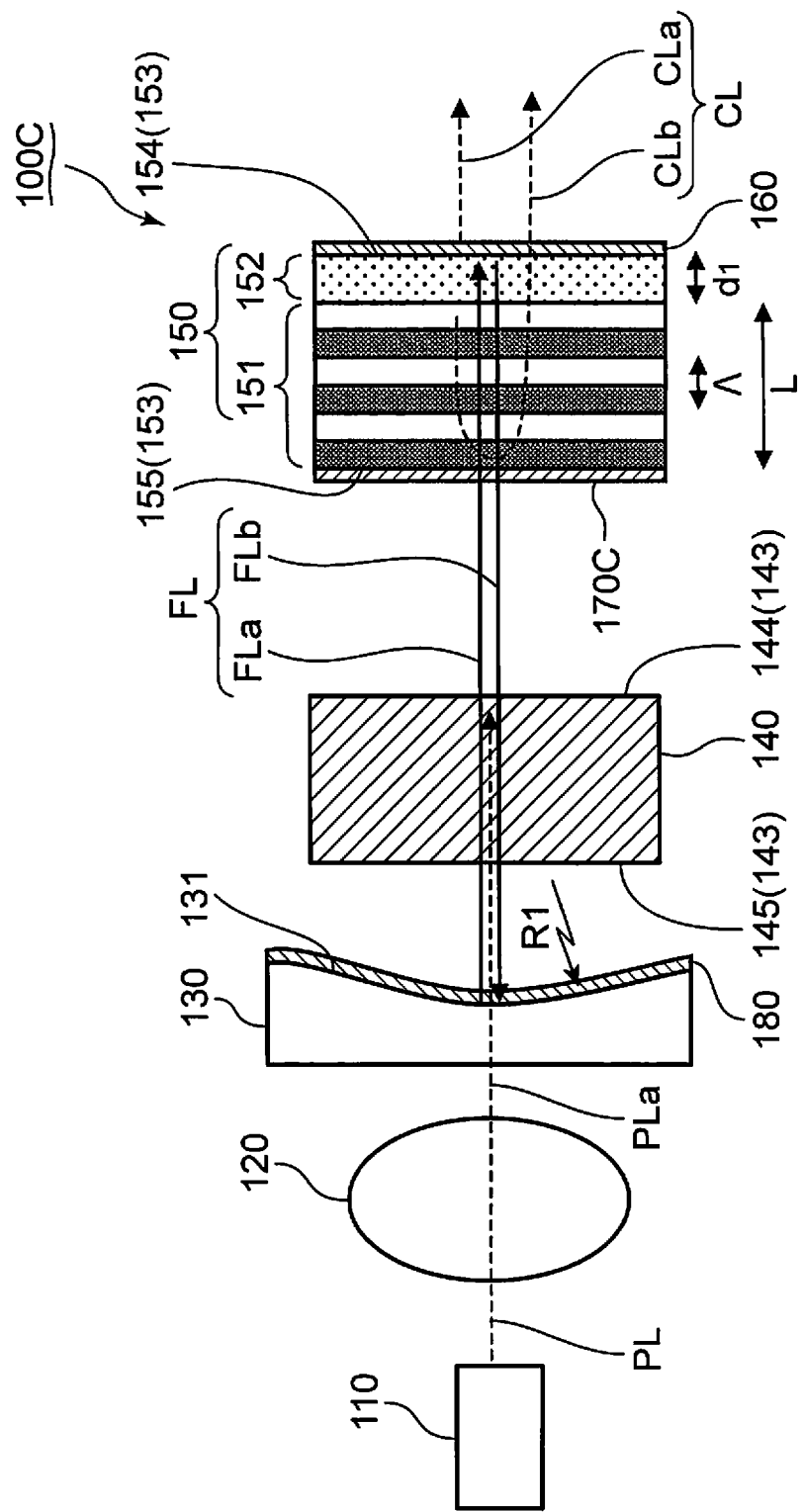
FIG. 7 is a schematic view of a wavelength conversion laser light source according to the fourth embodiment.

FIG. 7 is a schematic view of a wavelength conversion laser light source according to the fourth embodiment. The wavelength conversion laser light source according to the fourth embodiment is described with reference to FIG. 7.

The wavelength conversion laser light source 100C according to the present embodiment comprises a dielectric multi-layer film 170C, in addition to the excitation laser light source 110, the condensing lens 120, the concave lens 130, the solid laser medium 140, the wavelength convertor 150 and the dielectric multi-layer films 160, 180, like the wavelength conversion laser light source 100 described in the context of the first embodiment. The dielectric multi-layer film 170C which covers the incident end surface 155 of the wavelength convertor 150 has high reflectivity for the second harmonic light CL. The dielectric multi-layer film 170C reflects the second harmonic light CL which propagates along the optical path CLb from the emission end surface 154 of the wavelength convertor 150 toward the incident end surface 155. Consequently, the optical path CLa of the second harmonic light CL, which is directed to the emission end surface 154, and the optical path CLb of the second harmonic light CL, which is directed to the incident end surface 155 are appropriately aligned, so that the second harmonic light CL emitted from the resonator is preferably condensed at a single point.

Fifth Embodiment

The periodic polarization reversal structure may be deteriorated in a region nearby the incident end surface 155 of the wavelength convertor 150 of the wavelength conversion laser light source 100C described in the context of the fourth embodiment. Reverse conversion from the second harmonic light CL to the fundamental wave light FL may change a power of the second harmonic light CL.

A wavelength conversion laser light source according to the fifth embodiment reflects the second harmonic light at the incident end surface of the wavelength convertor. The wavelength conversion laser light source according to the present embodiment is characterized in having a non-converting region which is formed on the incident end surface side of the wavelength convertor.

Figure 8:
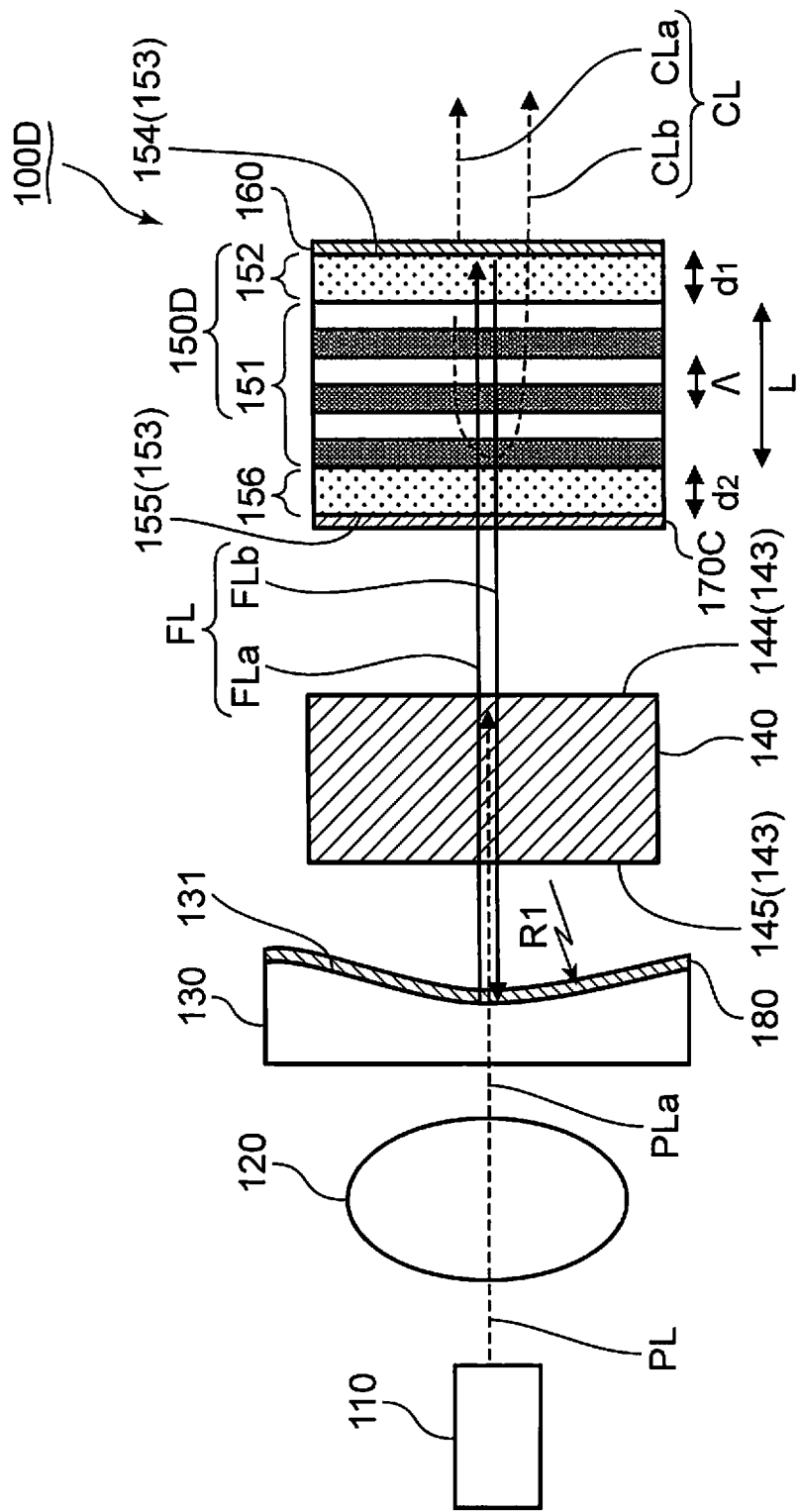
FIG. 8 is a schematic view of a wavelength conversion laser light source according to the fifth embodiment.

FIG. 8 is a schematic view of the wavelength conversion laser light source according to the fifth embodiment. The wavelength conversion laser light source according to the fifth embodiment is described with reference to FIG. 8.

The wavelength conversion laser light source 100D according to the present embodiment includes a wavelength convertor 150D, in addition to the excitation laser light source 110, the condensing lens 120, the concave lens 130, the solid laser medium 140 and the dielectric multi-layer films 160, 170C, 180, like the wavelength conversion laser light source 100C described in the context of the fourth embodiment. The wavelength convertor 150D has a non-converting region 156 situated between the wavelength converting region 151 and the dielectric multi-layer film 170C in addition to the wavelength converting region 151 and the non-converting region 152 like the wavelength convertor 150 described in the context of the fourth embodiment. The non-converting region 156 forms the incident end surface 155 of the wavelength convertor 150D. The non-converting region 156 is exemplified as the second non-converting region in the present embodiment. The dielectric multi-layer film 170C which covers the incident end surface 155 formed by the non-converting region 156 is exemplified as the second reflective film. The dielectric multi-layer films 170C, 160, which are formed on the end surfaces 153 of the wavelength convertor 150D, respectively, are exemplified as the first reflecting element.

The non-converting region 156 has a length $d_2$. If the second harmonic light CL has a wavelength width (full width at half maximum) of $\Delta\lambda_s$ [nm], the length $d_2$ of the non-converting region 156 preferably satisfies the following relationship defined in Expression 5.

$$d_2 \leq 40 \ \mu m / \Delta\phi_s \qquad \text{[Expression 5]}$$

If the aforementioned relationship defined by Expression 5 is satisfied, it becomes less likely that the periodic polarization reversal structure formed in the wavelength converting region 151 is deteriorated. Therefore, it also becomes less likely that a conversion rate from the fundamental wave light FL to the second harmonic light CL goes down.

The periodic polarization reversal structure of the wavelength converting region 151 has a period of Λ. The length $d_2$ of the non-converting region 156 preferably satisfies the following relationship defined by Expression 6.

$$d_2 \geq \Lambda \qquad \text{[Expression 6]}$$

If the aforementioned relationship defined by Expression 6 is satisfied, it becomes less likely that the periodic polarization reversal structure formed in the wavelength converting region 151 is deteriorated. Therefore, it also becomes less likely that the conversion rate from the fundamental wave light FL to the second harmonic light CL goes down.

The fundamental wave light FL has a wavelength width (full width at half maximum) of $\Delta\lambda_f$ [nm]. If the wavelength width $\Delta\lambda_f$ of the fundamental wave light FL is 0.2 nm, preferably, the length $d_2$ of the non-converting region 156 is set to no less than 1 mm. Consequently, power changes of the second harmonic light CL caused by the reverse conversion from the second harmonic light CL to the fundamental wave light FL is reduced to no more than 20%. If the length $d_2$ of the non-converting region 156 is set to 2 mm, the power change of the second harmonic light CL is reduced to no more than 5%, which results in a more stabilized output of second harmonic light CL.

Due to wavelength dispersion characteristics of the wavelength convertor 150D, phase differences between the fundamental wave light FL and the second harmonic light CL are averaged in the non-converting region 156, which results in a stabilized amount of the reverse conversion from the second harmonic light CL to the fundamental wave light FL. The greater the length $d_2$ of the non-converting region 156, the more stable the output of the second harmonic light CL.

However, an increased length of the non-converting region 156 results in an increase in losses inside the resonator, so that the fundamental wave light FL in the resonator decreases. In order to prevent an excessive decrease of the fundamental wave light FL, the length $d_2$ of the non-converting region 156 is preferably set to no more than 2 mm.

In the above descriptions, the wavelength width $\Delta\lambda_f$ of the fundamental wave light (the full width at half maximum) is 0.2 nm. However, the wavelength width $\Delta\lambda_f$ (full width at half maximum) of the fundamental wave light may take another value. If the length $d_2$ of the non-converting region 156 satisfies the following relationship defined by Expression 7, the power change of the second harmonic light CL is restricted to no more than 20%.

$$0.2 \text{ mm}/\Delta\lambda_f \leq d_2 \text{ [mm]} \quad \text{[Expression 7]}$$

If the length $d_2$ of the non-converting region 156 satisfies the following relationship defined by Expression 8, the power change of the second harmonic light CL is restricted to no more than 5%.

$$d_2 \text{ [mm]} = 0.3 \text{ mm}/\Delta\lambda_f \quad \text{[Expression 8]}$$

From the aforementioned considerations, the length $d_2$ of the non-converting region 156 is preferably set so as to satisfy the following relationship defined in Expression 9. If the following relationship of Expression 9 is satisfied, it becomes less likely that the conversion efficiency from the fundamental wave light FL to the second harmonic light CL goes down. Therefore, the output of the second harmonic light CL becomes stable.

$$0.2 \text{ mm}/\Delta\lambda_f \leq d_2 \leq 0.3 \text{ mm}/\Delta\lambda_f \quad \text{[Expression 9]}$$

The wavelength converting region 151 and the non-converting region 156 of the wavelength convertor 150D described in the context of the present embodiment may be formed from the same materials. Alternatively, the wavelength converting region 151 and the non-converting region 156 may be formed from different materials. In the present embodiment, MgLN is exemplified as the material used for the wavelength converting region 151. In this case, the non-converting region 156 may be formed from lithium tantalate. Consequently, absorption of the fundamental wave light FL is reduced to emit the high-power second harmonic light CL.

Sixth Embodiment

Figure 9:
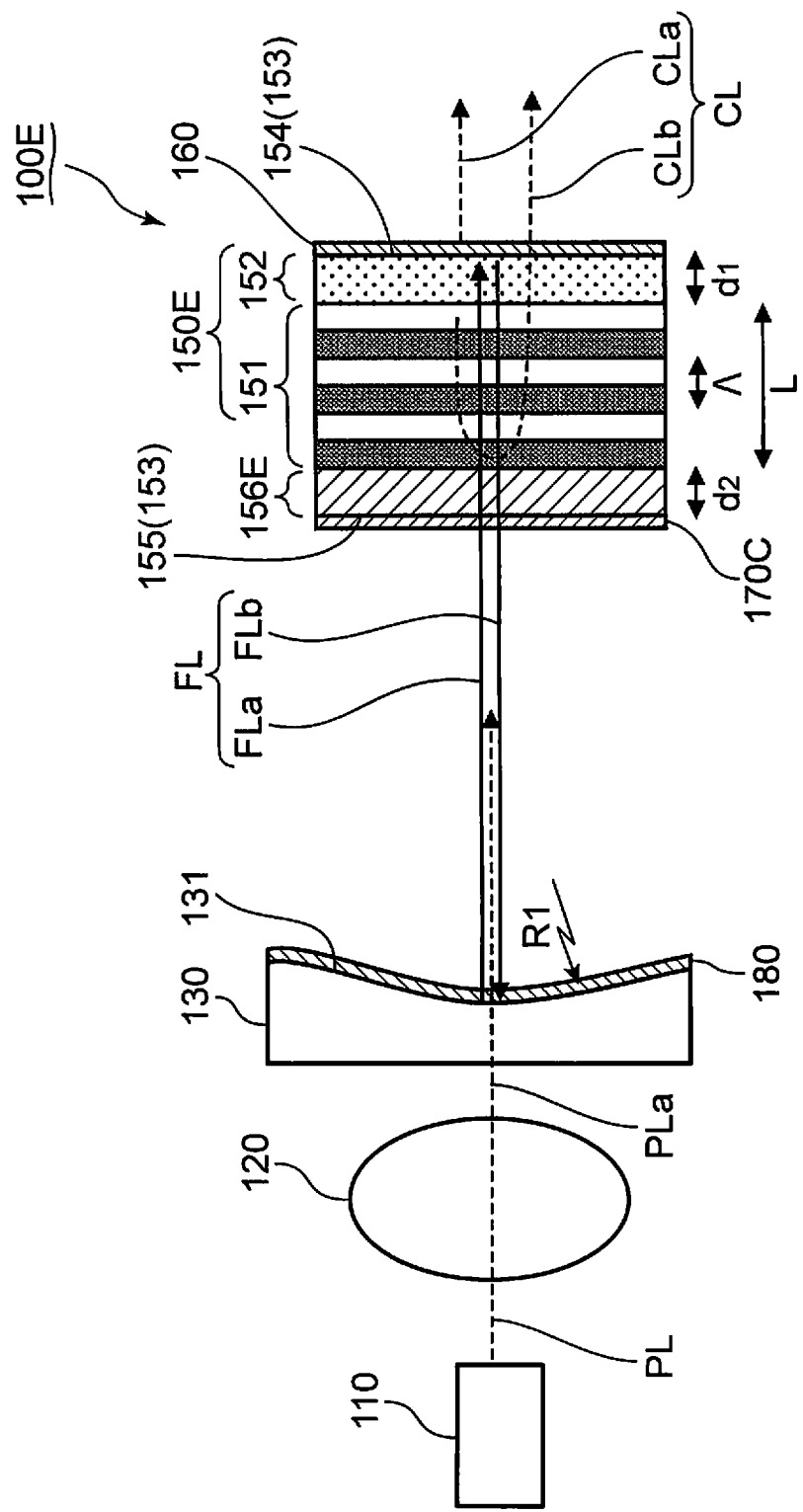
FIG. 9 is a schematic view of a wavelength conversion laser light source according to the sixth embodiment.

FIG. 9 is a schematic view of a wavelength conversion laser light source according to the sixth embodiment. The wavelength conversion laser light source according to the sixth embodiment is described with reference to FIGS. 8 and 9.

The wavelength conversion laser light source 100E according to the present embodiment includes a wavelength convertor 150E, in addition to the excitation laser light source 110, the condensing lens 120, the concave lens 130, and the dielectric multi-layer films 160, 170C, 180, like the wavelength conversion laser light source 100D described in the context of the fifth embodiment. The wavelength convertor 150E has a non-converting region 156E between the wavelength converting region 151 and the dielectric multi-layer film 170C, in addition to the wavelength converting region 151 and the non-converting region 152, like the wavelength convertor 150D described in the context of the fifth embodiment.

The non-converting region 156E is formed from a solid laser medium having birefringence, which results in similar advantageous effects to those of the wavelength conversion laser light source 100D described in the context of the fifth embodiment.

Unlike the wavelength conversion laser light source 100D described in the context of the fifth embodiment, the wavelength conversion laser light source 100E according to the present embodiment does not require a solid laser medium which is separate from the wavelength convertor. Consequently, the wavelength conversion laser light source 100E is formed to a compact size.

In the present embodiment, Nd:YVO$_4$ is exemplified as the solid laser medium which is used in the non-converting region 156E. Alternatively, Nd-doped GdVO$_4$, Nd-doped YAG or Yb-doped YAG crystals may be used as the solid laser medium, which is used for the non-converting region 156E. Further alternatively, a solid laser medium formed from a ceramic material rather than crystals may be used in the non-converting region 156E.

Figure 10:
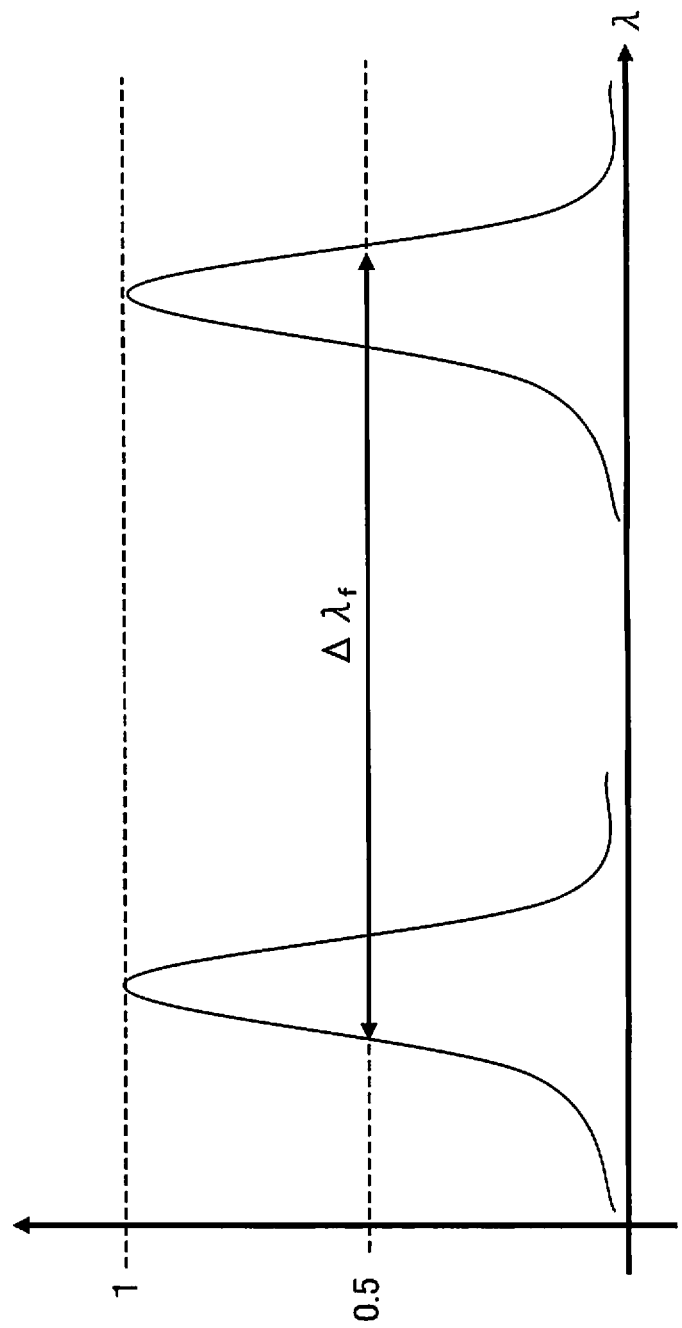
FIG. 10 is a graph schematically showing oscillation wavelength spectrum of fundamental wave light obtained if two different materials are simultaneously used in the non-converting region.

FIG. 10 is a graph showing a schematic view of an oscillation wavelength spectrum of fundamental wave light obtained when two different materials are simultaneously used in the non-converting region 156E. The wavelength conversion laser light source 100E is further described with reference to FIGS. 9 and 10.

The non-converting region 156E may be formed from two materials, for example, Nd:YVO$_4$ and Nd:GdVO$_4$. If two different materials are used for the non-converting region 156E, the fundamental wave light FL with an oscillation wavelength spectrum having two peak wavelengths is obtained. In this case, as shown in FIG. 10, the wavelength width $\Delta\lambda_f$ of the fundamental wave light FL means the wavelength width from the shorter one of the wavelengths, which define the full width at half medium of the oscillation wavelength spectrum having the shorter wavelength peak, to the larger one of the wavelengths which define the full width at half medium of the oscillation wavelength spectrum having the longer wavelength peak.

Seventh Embodiment

Figure 11:
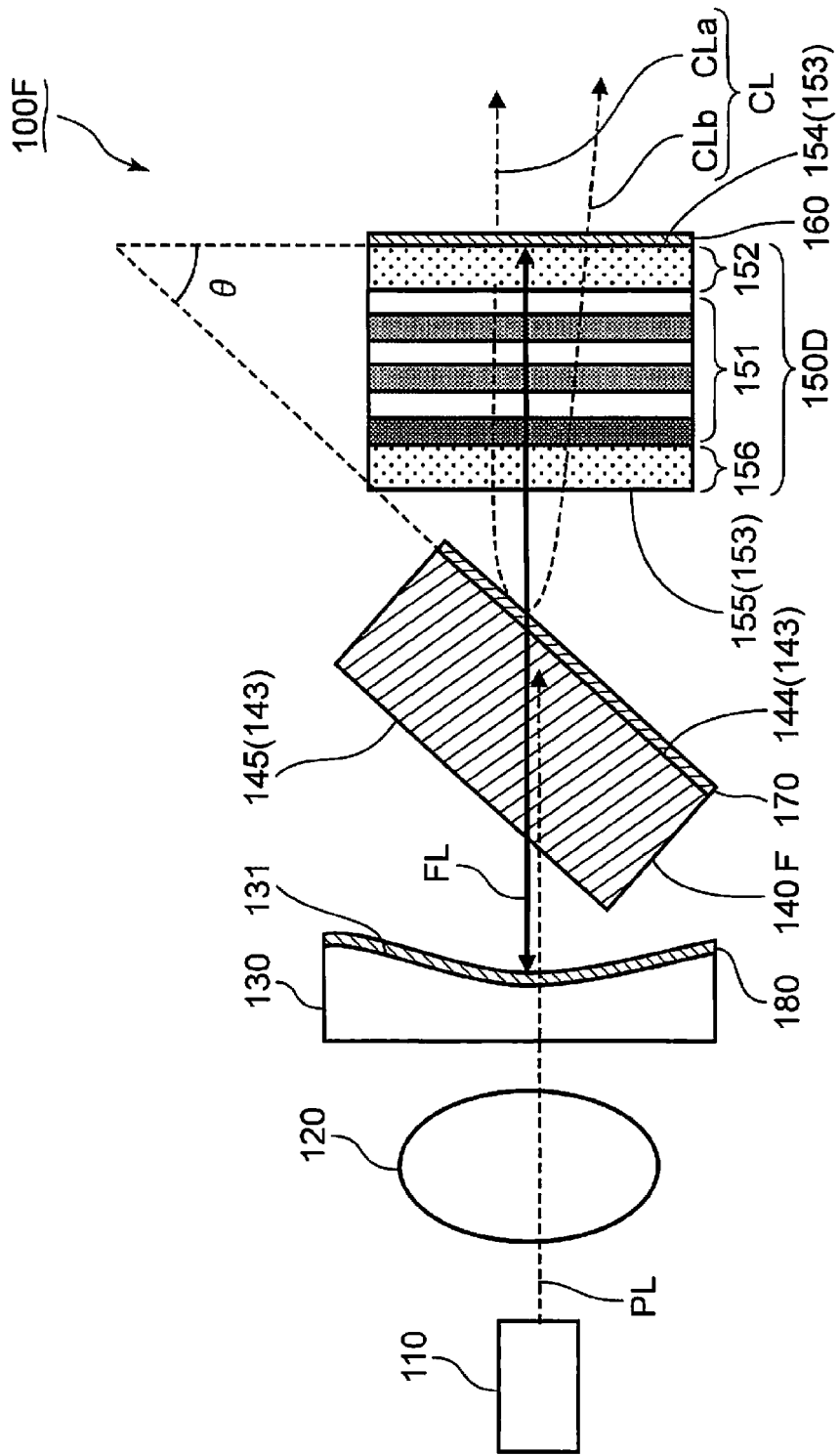
FIG. 11 is a schematic view of a wavelength conversion laser light source according to the seventh embodiment.

FIG. 11 is a schematic view of a wavelength conversion laser light source according to the seventh embodiment. The wavelength conversion laser light source according to the seventh embodiment is described with reference to FIG. 11.

The wavelength conversion laser light source 100F according to the present embodiment comprises: the excitation laser light source 110, the condensing lens 120, the concave lens 130, the wavelength convertor 150D and the dielectric multi-layer films 160, 180, like the wavelength conversion laser light source 100D described in the context of the fifth embodiment. The wavelength conversion laser light source 100F further comprises the dielectric multi-layer film 170 like the wavelength conversion laser light source 100 described in the context of the first embodiment. The wavelength conversion laser light source 100F further has a solid laser medium 140F. The dielectric multi-layer film 170, which has high reflectivity for the second harmonic light CL, covers the emission end surface 144 of the solid laser medium 140F. The dielectric multi-layer film 170 reflects the second harmonic light CL, which is generated as the converted light by the wavelength convertor 150D, toward the solid laser medium 140F. In the present embodiment, the dielectric multi-layer film 170 is exemplified as the second reflecting element.

The solid laser medium 140F is arranged so that the emission end surface 144, from which the fundamental wave light FL is emitted, is inclined at an angle of θ with respect to the emission end surface 154 of the wavelength convertor 150D, from which the second harmonic light CL is emitted. If the angle θ between the emission end surfaces 144, 154 of the solid laser medium 140F and the wavelength convertor 150D is set to be no less than 0.1° and no more than 89.9°, the reverse conversion from the second harmonic light CL to the fundamental wave light FL is suppressed. In the present embodiment, the emission end surface 144 of the solid laser medium 140F is exemplified as the first emission end surface.

As shown in FIG. 11, the emission end surface 144 of the solid laser medium 140F may be substantially parallel to the incident end surface 145 of the solid laser medium 140F. In this case, the entire solid laser medium 140F is inclined with respect to the optical path, so that the angle θ between the emission end surfaces 144, 154 of the solid laser medium 140F and the wavelength convertor 150D may be set to be no less than 0.1° and no more than 89.9°. If the emission end surface 144 of the solid laser medium 140F is inclined with respect to the emission end surface 154 of the wavelength convertor 150D, the optical path CLa of the second harmonic light CL directed to the emission end surface 154 by the wavelength convertor 150D diverges from the optical path CLb of the second harmonic light CL directed toward the incident end surface 155 by the wavelength convertor 150D. Consequently, while the reverse conversion from the second harmonic light CL to the fundamental wave light FL varies a power of the second harmonic light CL, it becomes less likely that the reverse conversion occurs.

It may be preferable to incline the solid laser medium 140F, in terms of enlargement of a beam diameter of the fundamental wave light FL inside the solid laser medium 140F.

Figure 12:
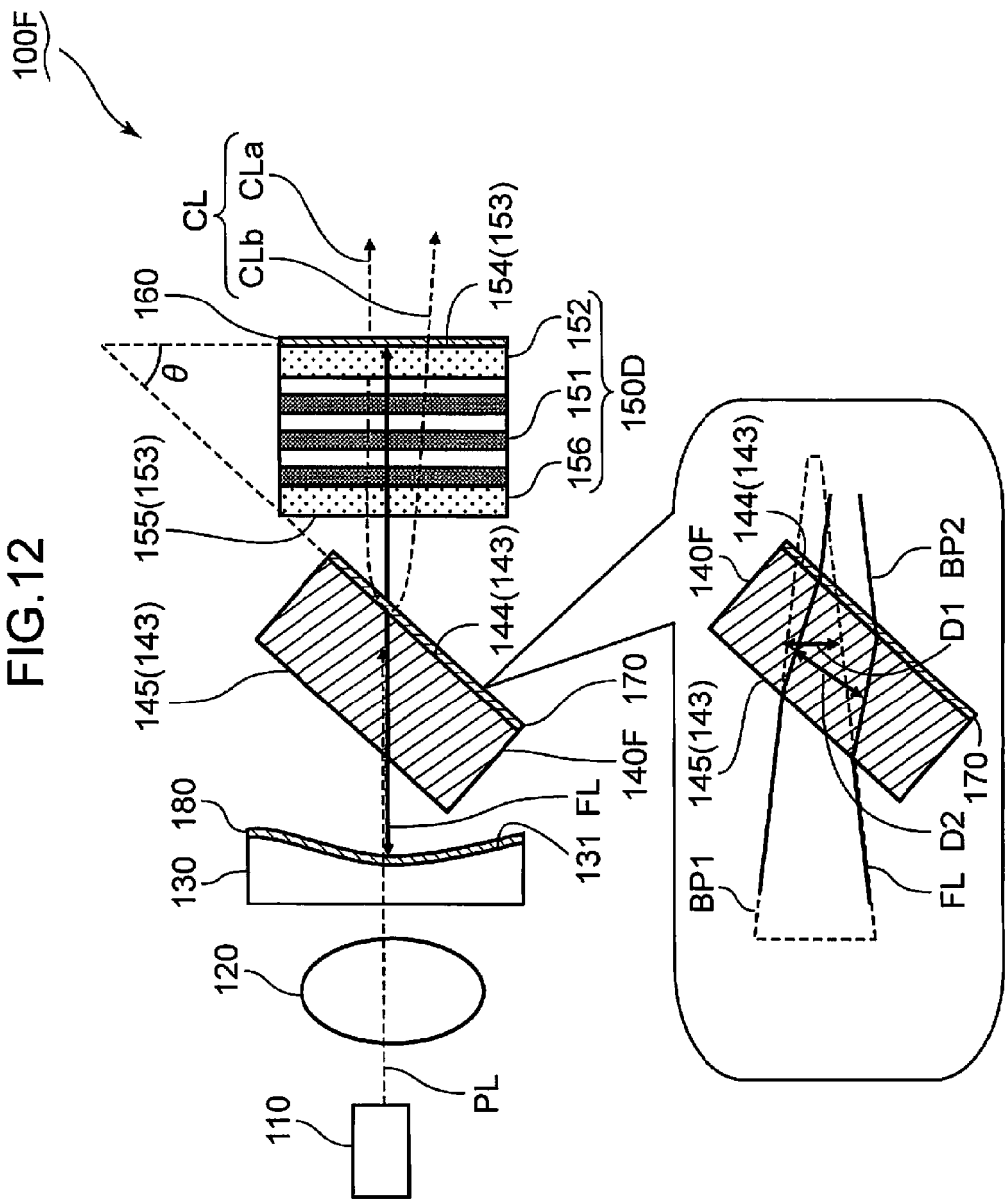
FIG. 12 is a schematic view showing a beam diameter of fundamental wave light in a solid laser medium of the wavelength conversion laser light source shown in FIG. 11.

FIG. 12 is a schematic view showing a beam diameter of the fundamental wave light FL in the solid laser medium 140F of the wavelength conversion laser light source 100F.

In FIG. 12, the region indicated by the dotted lines shows an optical path BP1 of the fundamental wave light FL in a solid laser medium which is arranged substantially in parallel with the emission end surface 154 of the wavelength convertor 150D. In FIG. 12, the region indicated by the solid lines shows an optical path BP2 of the fundamental wave light FL in the solid laser medium 140F which is inclined with respect to the emission end surface 154 of the wavelength convertor 150D.

In FIG. 12, the reference symbol "D1" indicates the beam diameter of the fundamental wave light FL in the solid laser medium which is arranged substantially in parallel with the emission end surface 154 of the wavelength convertor 150D. In FIG. 12, the reference symbol "D2" indicates the beam diameter of the fundamental wave light FL in the solid laser medium 140F which is inclined with respect to the emission end surface 154 of the wavelength convertor 150D.

The fundamental wave light FL incident on the inclined solid laser medium 140F is diffracted at the incident end surface 145. As a result of the diffraction of the fundamental wave light FL at the incident end surface 145, the beam diameter of the fundamental wave light FL in the solid laser medium 140F becomes larger. The fundamental wave light FL is subsequently emitted from the solid laser medium 140F. The fundamental wave light FL is diffracted again at the emission end surface 144 of the solid laser medium 140F. Consequently, the beam diameter D2 of the fundamental wave light FL emitted from the inclined solid laser medium 140F becomes equal to the beam diameter D1 of the fundamental wave light FL indicated by the optical path BP1.

Even if there are changes in refractive index and transverse mode inside the resonator in the non-converting region 152, since the beam diameter D2 in the solid laser medium 140F is larger, it becomes less likely that the conversion efficiency from the excitation laser light PL to the fundamental wave light FL goes down. Consequently, it becomes less likely that there is a power variation of the second harmonic light CL.

The refractive index for the excitation laser light PL differs from the refractive index for the fundamental wave light FL in the solid laser medium 140F. Therefore, the angle θ between the emission end surfaces 144, 154 of the solid laser medium 140F and the wavelength convertor 150D is preferably set to no more than 70° with taking account of beam overlap between the excitation laser light PL and the fundamental wave light FL.

The solid laser medium 140F may be arranged so that the end surface 143 of the solid laser medium 140F is inclined at Brewster's angle with respect to the optical path of the excitation laser light PL. If the solid laser medium 140F is arranged so that the end surface 143 of the solid laser medium 140F is inclined at Brewster's angle with respect to the optical path of the excitation laser light PL, a transmission rate of the fundamental wave light FL, which is P polarized light, is raised at the end surface 143 of the solid laser medium 140F. Therefore, it becomes unnecessary to form a multi-layer film on the end surface of the solid laser medium 140F in order to decrease reflectivity for the fundamental wave light FL. Thus, the wavelength conversion laser light source 100F becomes inexpensive.

On the other hand, since the reflectivity for the fundamental wave light FL, which is S polarized light, is high at the end surface 143 of the solid laser medium 140F, it becomes less likely that the S polarized light is oscillated. Consequently, the resultant polarized light from the oscillation of the fundamental wave light FL becomes single-polarized. If the light is single-polarized, the conversion efficiency from the fundamental wave light FL to the second harmonic light CL goes up. In addition, since there is no conflict of transverse modes, the output of the second harmonic light CL becomes stabilized.

Figure 13:
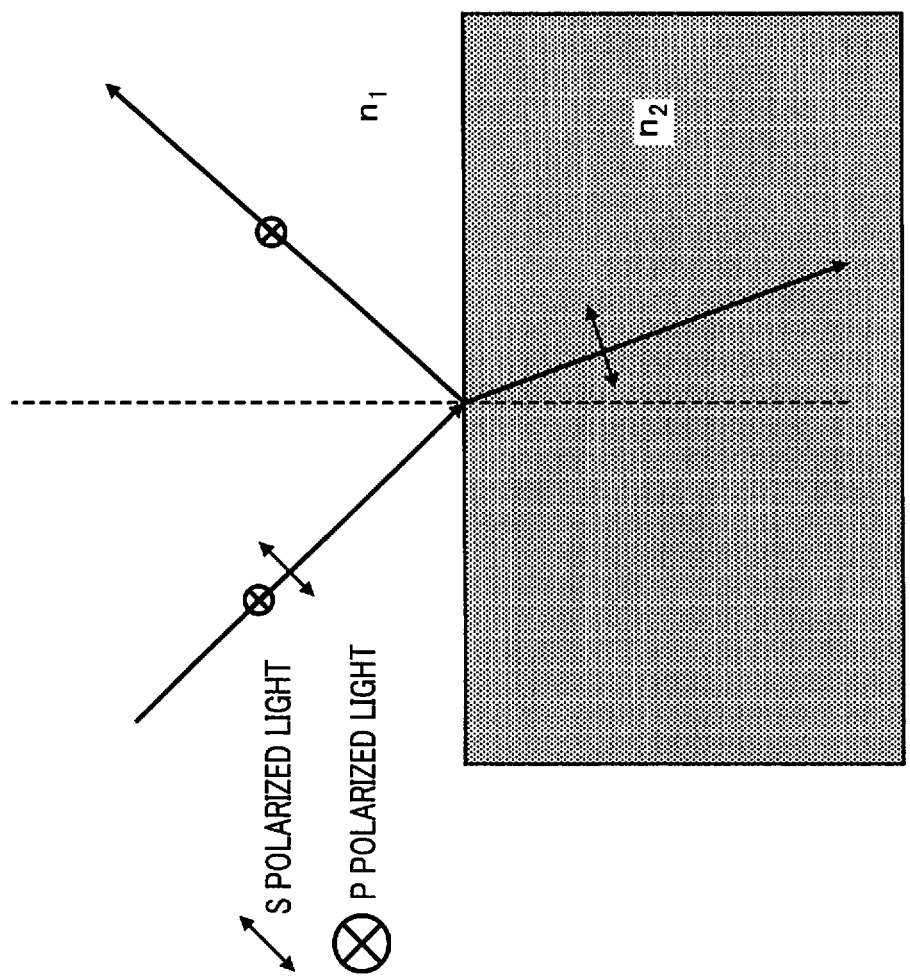
FIG. 13 is a schematic view to explain the Brewster's angle.

FIG. 13 is a schematic view for explaining Brewster's angle. The wavelength conversion laser light source 100F is further described with reference to FIGS. 12 and 13.

FIG. 13 shows a medium having a refractive index of n1 and a medium having a refractive index of n2. Brewster's angle means the angle at which an incident angle of light incident on the medium of refractive index n2 from the medium of refractive index n1 is expressed by arctan (n2/n1).

If the principle of Brewster's angle shown in FIG. 13 is applied to the wavelength conversion laser light source 100F, the refractive index in the resonator is expressed by "n1". The refractive index of the solid laser medium 140F is expressed by "n2". The above advantageous effects may be obtained if the angle θ between the emission end surfaces 154, 144 of the wavelength convertor 150D and the solid laser medium 140F is set to Brewster's angle or a range of no less than 96.4% and no more than 104% with respect to Brewster's angle.

(Wavelength Conversion Laser Light Source with Slab Structure)

A series of the principles of the aforementioned embodiments are preferably applicable to a wavelength conversion laser light source having a slab structure.

Figure 14:
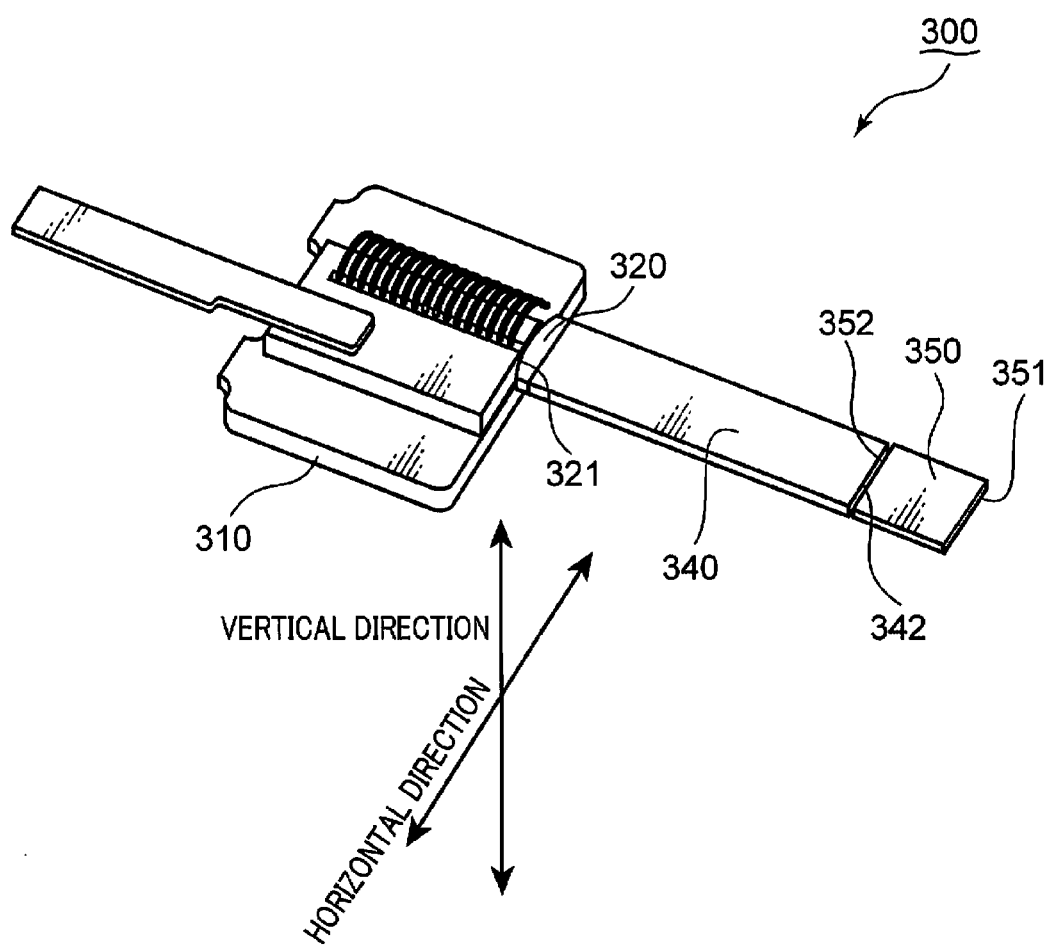
FIG. 14 is a schematic perspective view of a wavelength conversion laser light source having a slab structure.

FIG. 14 is a schematic perspective view of a wavelength conversion laser light source having a slab structure. The wavelength conversion laser light source is described with reference to FIG. 14.

The wavelength conversion laser light source 300 shown in FIG. 14 has a slab structure. The wavelength conversion laser light source 300 has an excitation laser light source 310, a condensing lens 320, a laser medium 340 and an SHG element 350 (Second Harmonic Generation element). The upper and lower surfaces of the laser medium 340 and/or the SHG element 350 are optically polished and coated with a material having low reflectivity. Consequently, the laser medium 340 and/or the SHG element 350 become cladding to guide light inside the laser medium 340 and/or SHG element 350. Non-reflective films are coated onto the end surface 342 of the laser medium 340, which faces the SHG element 350, and the end surface 352 of the SHG element 350, which faces the laser medium 340, respectively.

The excitation laser light source 310 emits excitation laser light toward the condensing lens 320. The condensing lens 320 horizontally condenses the excitation laser light. The excitation laser light is confined by the cladding. Therefore, it becomes unnecessary to vertically condense the excitation laser light.

The end surface of the condensing lens 320, which faces the excitation laser light source 310, is used as the first reflecting surface 321. The first reflecting surface 321 reflects light in 1060 nm and 530 nm wavebands.

The emission end surface of the SHG element 350, from which second harmonic light is emitted, works as the second reflecting surface 351. The second reflecting surface 351 reflects the light in the 1060 nm waveband, and transmits the light in the 530 nm waveband. The first and second reflecting surfaces 321, 351 work as a resonator.

The laser medium 340 absorbs the excitation laser light, which is condensed by the condensing lens 320, so that the laser medium 340 generates the fundamental wave light in the 1060 nm waveband. The fundamental wave light is subjected to the laser oscillation inside the resonator formed by the first and second reflecting surfaces 321, 351.

If the fundamental wave light under the laser oscillation passes through the SHG element 350, the second harmonic light in the 530 nm waveband is output.

For example, the laser medium 340 and the SHG element 350 may be approximately 100 μm in thickness. Accordingly, a power density of the generated fundamental wave light in the 1060 nm waveband is increased inside the laser medium 340 and the SHG element 350. Thus, the conversion efficiency from the fundamental wave light to the second harmonic light goes up.

The problems described with reference to FIGS. 16 and 17 become noticeable because of the aforementioned large optical power density in the wavelength conversion laser light source having a slab structure.

The non-converting region described in the context of the series of the aforementioned embodiments is incorporated into the SHG element 350. Consequently, it becomes less likely that the SHG element 350 changes in refractive index. Therefore, it becomes less likely that the change in refractive index deteriorates the polarization reversal structure. Thus, the wavelength conversion laser light source 300 is formed to a compact size and has high wavelength conversion efficiency. In addition, the wavelength conversion laser light source 300 may emit high-power second harmonic light.

In the series of the aforementioned embodiments, the wavelength convertor is formed from MgLN. Alternatively, the wavelength convertor may be formed from a material such as lithium tantalate or potassium titanyl phosphate. If the periodic polarization reversal structure is formed from these materials, the advantageous effects described in the context of the series of the aforementioned embodiments are obtained.

In the series of aforementioned embodiments, the wavelength convertor converts the fundamental wave light having a wavelength of 1064 nm to the second harmonic light having a wavelength of 532 nm. Alternatively, the wavelength convertor may convert the fundamental wave light of another wavelength to the harmonic light of the fundamental wave light, or a sum frequency light wave or difference frequency light wave. The wavelength conversion laser light source which incorporates such a wavelength convertor also results in the advantageous effects described in the context of the series of the aforementioned embodiments.

The fundamental wave light may have several wavelengths. The wavelength convertor may generate a sum frequency light wave or a differential frequency light wave from the fundamental wave light. The wavelength conversion laser light source which incorporates such a wavelength convertor also results in the advantageous effects described in the context of the series of the aforementioned embodiments.

The polarization reversal period Λ of the polarization reversal structure formed in the wavelength converting region of the wavelength convertor is a uniform period of approximately 7 μm in the series of the aforementioned embodiments. Alternatively, a polarization reversal structure having various periods may be formed in the wavelength converting region of the wavelength convertor. A phase control region may be inserted into the polarization reversal region which is formed in the wavelength converting region. The polarization reversal period of the polarization reversal structure may be changed in a chirp shape. These various polarization reversal structures preferably expand an acceptable range of wavelengths to achieve phase matching.

In the series of the aforementioned embodiments, an artificial phase matching type of the wavelength convertor is described, which has a wavelength converting region where a periodic polarization reversal structure is formed and a non-converting region which does not contribute to the wavelength conversion from the fundamental wave light to the second harmonic light. The series of the aforementioned embodiments are no more than examples of wavelength conversion laser light sources. Thus, the above descriptions do not limit an applicable range of the principles of the aforementioned embodiments. It should be understood that a person skilled in the art should easily recognize that various modifications and combinations may be implemented without departing from a spirit and scope of the aforementioned principles.

Eighth Embodiment

In the eighth embodiment, a liquid crystal display apparatus is exemplified as the image display device. The liquid crystal display apparatus according to the eighth embodiment comprises a backlight illuminator including the wavelength conversion laser light source as described in the context of the aforementioned first to seventh embodiments.

Figure 15:
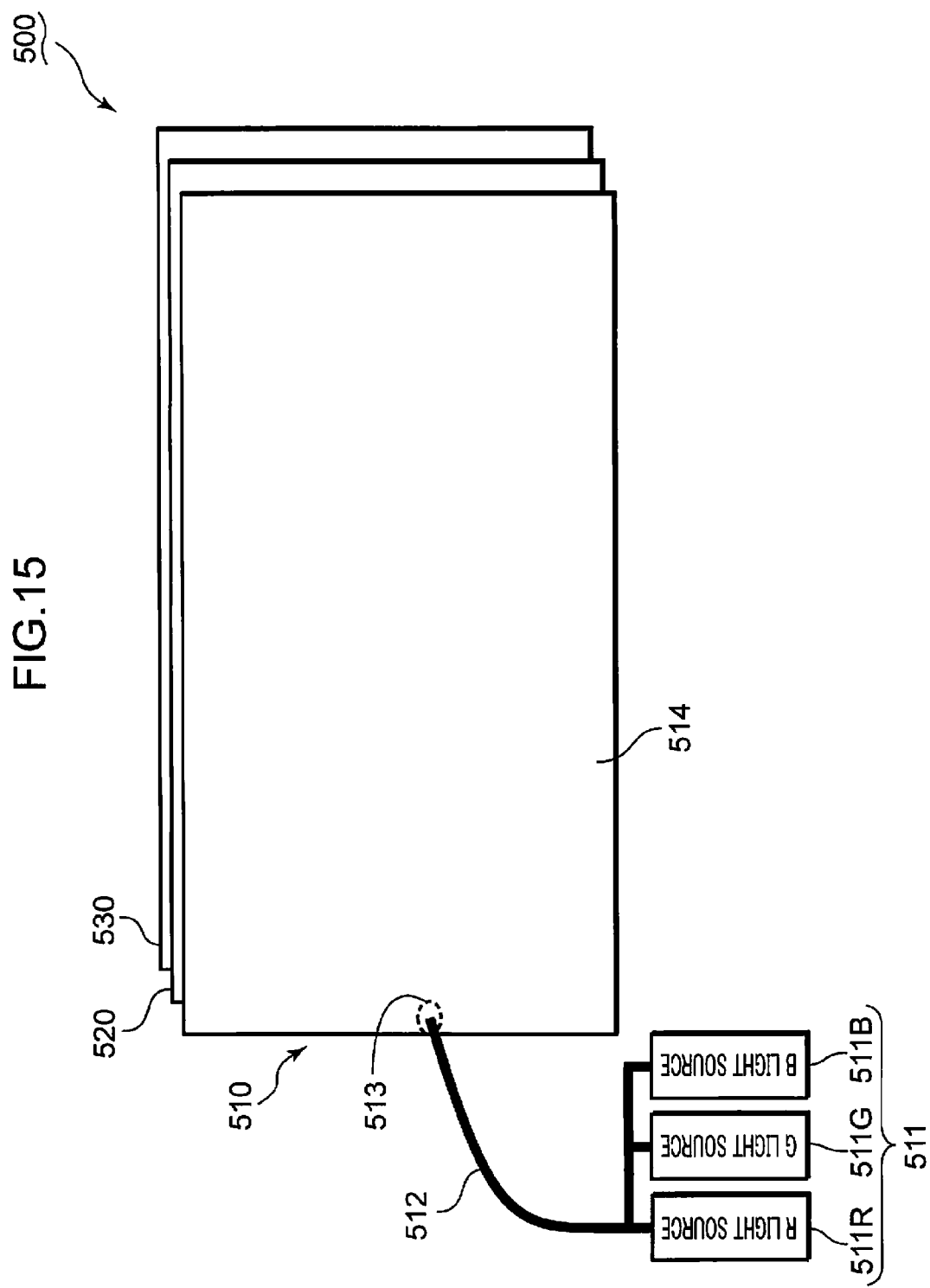
FIG. 15 is a schematic view of a liquid crystal display apparatus exemplified as the image display device according to the eighth embodiment.

FIG. 15 is a schematic view of the liquid crystal display apparatus. The liquid crystal display apparatus is described with reference to FIG. 15.

The liquid crystal display apparatus 500 comprises the backlight illuminator 510. The backlight illuminator 510 comprises a light source portion 511. The light source portion 511 includes a red laser light source (hereinafter, called R light source 511R), which emits a red laser beam, a green laser light source (hereinafter, called G light source 511G), which emits a green laser beam, and a blue laser light source (hereinafter, called B light source 511B), which emits a blue laser beam.

The backlight illuminator 510 further includes: an optical fiber 512, an optical waveguide portion 513, which is provided at the tip of the optical fiber 512, and an optical waveguide plate 514, which equalizes the laser beam from the optical waveguide portion 513.

The liquid crystal display apparatus 500 further comprises: a liquid crystal display panel 520, which is used as a spatial light modulator for modulating the red, green and blue laser beams, and a polarization plate 530 which polarizes the light from the liquid crystal display panel 520.

In the light source portion 511, the wavelength conversion laser light source according to any one of the aforementioned first to seventh embodiments is used as the G light source 511G. A semiconductor laser formed from AlGaInP/GaAs type materials is used as the R light source 511R. The R light source 511R emits the red laser beam having a wavelength of 640 nm. A semiconductor laser formed from GaN type materials is used as the B light source 511B. The B light source 511B emits the blue laser beam having a wavelength of 450 nm.

The optical fiber 512 gathers the red, green and blue laser beams from the light source portion 511 to guide the light into the optical waveguide plate 514 through the optical waveguide portion 513. The optical waveguide plate 514 uniformly emits the laser light introduced through the optical waveguide portion 513 from its main surface (not illustrated). In the present embodiment, the optical fiber 512 is exemplified as the optical path for guiding the laser beam emitted from the laser light source to the spatial light modulator.

The G light source 511G may comprise optical components such as a condensing lens, in addition to the wavelength conversion laser light source described in the context of the first to seventh embodiments. Therefore, the light emit from the G light source 511G is efficiently coupled to the optical fiber 512 and guided to the optical waveguide plate 514.

The aforementioned liquid crystal display apparatus 500 may display images having excellent color reproducibility under low power consumption.

A large-screen image forming apparatus generally requires a stable and high-power laser light source. The wavelength conversion laser light source described in the context of the aforementioned first to seventh embodiments satisfies the required characteristics for the large-screen image forming apparatus. Therefore, the image forming apparatus may have a large screen size.

In the present embodiment, the liquid crystal display apparatus, which uses the transmissive liquid crystal panel as the spatial light modulator, is exemplified as the image display device employing the laser light source. Alternatively, an apparatus such as a projector using a spatial light modulator (for example, a Digital Micro-Mirror Device (DMD) or a reflective liquid crystal (Liquid Crystal on Silicon: LCOS) may be used as the image display device. The principles of the series of the aforementioned embodiments may be preferably applied to these image display devices, so that the above advantageous effects may be obtained in this case.

In the present embodiment, the light emitted from the laser light source is guided to the spatial light modulator by means of the optical fiber, the optical waveguide portion and the optical waveguide plate. Alternatively, a suitable optical element such as a dichroic mirror, a cross prism or a rod integrator may be used, instead of these optical elements.

The series of the aforementioned embodiments are no more than examples of a wavelength conversion laser light source and an image forming apparatus. Therefore, the above descriptions do not limit an applicable range of the principles of the aforementioned embodiments. It should be understood that a person skilled in the art should easily recognize that various modifications and combinations may be implemented without departing from a spirit and scope of the aforementioned principles.

The aforementioned embodiments mainly comprise the following compositions. Typically, the wavelength conversion laser light source and the image display device having the following configurations condense fundamental wave light inside a wavelength convertor to increase conversion efficiency from input power to second harmonic light. A non-converting region results in little changes with time (for example, change in a transverse mode or a resonator length) during a prolonged operation of the wavelength conversion laser light source and the image display device. Accordingly, the resonator is stabilized to maintain high conversion efficiency. Therefore, the wavelength conversion laser light source and the image display device may stably output the second harmonic light.

A wavelength conversion laser light source according to one aspect of the aforementioned embodiments comprises: a laser medium configured to generate fundamental wave light; a laser resonator configured to cause laser oscillation of the fundamental wave light; a wavelength convertor including a wavelength converting region to convert the fundamental wave light under the laser oscillation by means of the laser resonator into converted light of a different wavelength; and an excitation laser light source configured to excite the laser medium, wherein the laser resonator includes at least one reflecting surface which reflects the fundamental wave, and a first reflecting element which is provided on an end surface of the wavelength convertor to reflect the fundamental wave light; the wavelength converting region is situated between the at least one reflecting surface and the first reflecting element; the wavelength convertor includes a periodic first polarization reversal structure formed in the wavelength converting region, and a non-converting region formed between the first reflecting element and the wavelength converting region; and the non-converting region does not convert the fundamental wave light into the converted light.

According to the aforementioned configuration, the laser medium is excited by the excitation laser light source to generate the fundamental wave light. The laser resonator causes laser oscillation of the fundamental wave light generated by the laser medium. The wavelength convertor is provided with a wavelength converting region which converts the fundamental wave light under the laser oscillation by means of the laser resonator into the converted light of a different wavelength. The laser resonator includes at least one reflecting surface which reflects the fundamental wave and a first reflecting element which reflects the fundamental wave. The first reflecting element is provided on an end surface of the wavelength convertor. The wavelength converting region is situated between the at least one reflecting surface and the first reflecting element. The wavelength convertor comprises a periodic first polarization reversal structure formed in the wavelength converting region, and a non-converting region formed between the first reflecting element and the wavelength converting region. Due to the non-converting region, it becomes less likely that there are changes with time such as changes in a transverse mode or a resonator length during a prolonged operation of the wavelength conversion laser light source, so that the resonator may be stably operated. Therefore, the converted light is stably output with high conversion efficiency.

In the aforementioned configuration, preferably, the first polarization reversal structure includes a first polarization reversal period of $\Lambda$ [μm]; the non-converting region has a length of $d_1$ [μm]; and the first polarization reversal period and the length of the non-converting region satisfy a relationship defined by $\Lambda \leq d_1 \leq 2000$ μm.

According to the aforementioned configuration, the first polarization reversal structure has a first polarization reversal period of $\Lambda$ [μm], and the non-converting region has a length of $d_1$ [μm]. The first polarization reversal period and the length of the non-converting region satisfy the relationship defined by $\Lambda \leq d_1 \leq 2000$ µm. Therefore, the resonator causes little loss.

In the aforementioned configuration, preferably, the wavelength convertor converts the fundamental wave light into second harmonic light having a wavelength width of $\Delta\lambda_s$ as the converted light; and a length of the non-converting region which is single-polarized satisfies a relationship defined by $\Lambda \leq d_1 \leq 40$ µm/$\Delta\lambda_s$.

According to the aforementioned configuration, the wavelength convertor converts the fundamental wave light into the second harmonic light having a wavelength width of $\Delta\lambda_s$ as the converted light. The length of the single-polarized non-converting region satisfies the relationship defined by $\Lambda \leq d_1 \leq 40$ µm/$\Delta\lambda_s$. Thus, it becomes less likely that the output of the second harmonic light declines.

In the above configuration, preferably, the non-converting region includes a periodic second polarization reversal structure; a second polarization reversal period of the second polarization reversal structure corresponds to ½n times as long as a first polarization reversal period of the first polarization reversal structure (where n is a natural number); and a length of the non-converting region satisfies a relationship defined by $2n\Lambda \leq d_1 \leq 2000$ µm.

According to the above configuration, the non-converting region includes a periodic second polarization reversal structure. The second polarization reversal period of the second polarization reversal structure corresponds to ½n times as long as the first polarization reversal period of the first polarization reversal structure. The length of the non-converting region satisfies the relationship defined by $2n\Lambda \leq d_1 \leq 2000$ µm. Thus, the non-converting region becomes less influential on the conversion of the fundamental wave light to the converted light.

In the aforementioned configuration, preferably, the end surface includes an emission end surface from which the converted light is emitted; the first reflecting element provided on the emission end surface includes a first reflecting film which reflects the fundamental wave light; and the non-converting region includes a first non-converting region which forms the emission end surface.

According to the above configuration, the end surface includes an emission end surface from which converted light is emitted. The first reflecting element provided on the emission end surface includes a first reflecting film which reflects the fundamental wave light. The non-converting region includes a first non-converting region which forms the emission end surface. Therefore, the resonator may be stably operated. Consequently, the converted light is stably output with high conversion efficiency.

In the aforementioned configuration, preferably, the end surface includes an incident end surface on which the fundamental wave light is incident; the first reflecting element provided on the incident end surface includes a second reflecting film which reflects the converted light; the non-converting region includes a second non-converting region which forms the incident end surface; the fundamental wave light has a wavelength width of $\Delta\lambda_f$; the second non-converting region has a length of $d_2$; and the wavelength width of the fundamental wave light and the length of the second non-converting region satisfy a relationship defined by $0.2$ mm/$\Delta\lambda_f \leq d_2 \leq 0.3$ mm/$\Delta\lambda_f$.

According to the above configuration, the wavelength convertor has an incident end surface on which fundamental wave light FL is incident. The first reflecting element includes a second reflecting film provided on the incident end surface. The second reflecting film reflects the converted light. The non-converting region includes a second non-converting region which forms the incident end surface. The fundamental wave light has a wavelength width of $\Delta\lambda_f$, and the second non-converting region has a length of $d_2$. Since the wavelength width of the fundamental wave light and the length of the second non-converting region satisfy the relationship defined by $0.2$ mm/$\Delta\lambda_f \leq d_2 \leq 0.3$ mm/$\Delta\lambda_f$, the converted light is stably emitted.

In the above configuration, preferably, the laser medium has: a first emission end surface from which the fundamental wave light is emitted and a second reflecting element provided on the emission end surface; the second reflecting element reflects the converted light; the end surface includes a second emission end surface from which the converted light is emitted; the first end surface is inclined at an angle of θ with respect to the second emission end surface; and the angle of the first emission end surface with respect to the second emission end surface satisfies a relationship defined by $0.1° \leq \theta \leq 70°$.

According to the aforementioned configuration, the laser medium includes a first emission end surface from which fundamental wave light is emitted, and a second reflecting element provided on the emission end surface. The second reflecting element reflects the converted light. The end surface includes a second emission end surface from which the converted light is emitted. The second emission end surface is inclined at an angle of θ with respect to the first emission end surface. Since the angle of the second emission end surface with respect to the first emission end surface satisfies the relationship defined by $0.1° \leq \theta \leq 70°$, it becomes less likely that there is reverse conversion from the converted light to the fundamental wave light. An appropriate overlapping region is set between the fundamental wave light and the excitation light for exciting the laser medium.

In the aforementioned configuration, preferably, the resonator has a refractive index of n1; the laser medium has a refractive index of n2; and the angle of the first emission end surface with respect to the second emission end surface satisfies a relationship defined by $0.964 \times \arctan(n2/n1) \leq \theta \leq 1.04 \times \arctan(n2/n1)$.

According to the aforementioned configuration, the resonator has a refractive index of n1, and the laser medium has a refractive index of n2. Since the angle of the second emission end surface with respect to the first emission end surface satisfies the relationship defined by $0.964 \times \arctan(n2/n1) \leq \theta \leq 1.04 \times \arctan(n2/n1)$, the converted light is stably output.

The image display device according to another aspect of the aforementioned embodiments comprises: a laser light source configured to emit laser light of at least one hue of red, green and blue; a spatial light modulator configured to modulate the laser light emitted from the laser light source; and an optical system configured to guide the laser light emitted from the laser light source to the spatial light modulator, wherein the laser light source includes the aforementioned wavelength conversion laser light source.

According to the aforementioned configuration, the laser light source emits laser light of at least one hue of red, green and blue. The spatial light modulator modulates the laser light emitted from the laser light source. The optical system guides the laser light emitted from the laser light source to the spatial light modulator. The laser light source includes the aforementioned wavelength conversion laser light source. Due to the non-converting region, it becomes less likely that there are changes with time such as changes in a transverse mode or a resonator length during a prolonged operation of the wavelength conversion laser light source. Therefore, the resonator may be stably operated. Thus, the converted light is stably output with high conversion efficiency, so that the image is stably displayed.

INDUSTRIAL APPLICABILITY

The principles of the series of the aforementioned embodiments are suitably applicable to a highly efficient wavelength conversion laser light source having excellent temperature control characteristics and output stability.

The invention claimed is:

1. A wavelength conversion laser light source, comprising:
a laser medium configured to generate fundamental wave light;
a laser resonator configured to cause laser oscillation of the fundamental wave light;
a wavelength convertor including (i) a wavelength converting region to convert the fundamental wave light under the laser oscillation caused by the laser resonator into converted light of a different wavelength, (ii) an emission end surface from which the converted light is emitted, and (iii) an incident end surface on which the fundamental wave light is incident; and
an excitation laser light source configured to excite the laser medium,
wherein the laser resonator includes (i) at least one reflecting surface which reflects the fundamental wave light, (ii), a first reflecting film, which is provided on the emission end surface to reflect the fundamental wave light, and (iii) a second reflecting film situated on the incident end surface on which the fundamental wave light is incident,
wherein the wavelength converting region is situated between the at least one reflecting surface and the first reflecting film,
wherein the wavelength convertor includes a periodic first polarization reversal structure formed in the wavelength converting region, and a non-converting region including (i) a first non-converting region formed between the first reflecting film and the wavelength converting region and (ii) a second non-converting region formed between the second reflecting film and the wavelength converting region, and
wherein the non-converting region does not convert the fundamental wave light into the converted light.

2. The wavelength conversion laser light source according to claim 1,
wherein the first polarization reversal structure includes a first polarization reversal period of $\Lambda$ [μm],
wherein the first non-converting region has a length of $d_1$ [μm], and
wherein the first polarization reversal period and the length of the first non-converting region satisfy a relationship defined by $\Lambda \leq d_1 \leq 2000$ μm.

3. The wavelength conversion laser light source according to claim 2,
wherein the wavelength convertor converts the fundamental wave light into second harmonic light having a wavelength width of $\Delta\lambda_s$ as the converted light, and
wherein a length of the first non-converting region which is single-polarized satisfies a relationship defined by $\Lambda \leq d_1 \leq 40$ μm/$\Delta\lambda_s$.

4. The wavelength conversion laser light source according to claim 2,
wherein the non-converting region includes a periodic second polarization reversal structure,
wherein a second polarization reversal period of the second polarization reversal structure corresponds to ½n times as long as a first polarization reversal period of the first polarization reversal structure (where n is a natural number), and
wherein a length of the first non-converting region satisfies a relationship defined by $2n\Lambda \leq d_1 \leq 2000$ μm.

5. The wavelength conversion laser light source according to claim 1,
wherein the first non-converting region forms the emission end surface.

6. The wavelength conversion laser light source according to claim 5,
wherein the second non-converting region forms the incident end surface,
wherein the fundamental wave light has a wavelength width of $\Delta\lambda_f$,
wherein the second non-converting region has a length of $d_2$, and
wherein the wavelength width of the fundamental wave light and the length of the second converting region satisfy a relationship defined by $0.2$ mm/$\Delta\lambda_f \leq d_2 \leq 0.3$ mm/$\Delta\lambda_f$.

7. The wavelength conversion laser light source according to claim 1,
wherein the laser medium includes a first emission end surface from which the fundamental wave light is emitted and a reflecting element provided on the first emission end surface,
wherein the reflecting element reflects the converted light,
wherein the emission end surface of the wavelength convertor is a second emission end surface from which the converted light is emitted,
wherein the first emission end surface is inclined at an angle of $\theta$ with respect to the second emission end surface, and
wherein the angle of the first emission end surface with respect to the second emission end surface satisfies a relationship defined by $0.1° \leq \theta \leq 70°$.

8. The wavelength conversion laser light source according to claim 7,
wherein the resonator has a refractive index of n1,
wherein the laser medium has a refractive index of n2, and
wherein the angle of the first emission end surface with respect to the second emission end surface satisfies a relationship defined by $0.964 \times \arctan(n2/n1) \leq \theta \leq 1.04 \times \arctan(n2/n1)$.

9. An image forming apparatus, comprising:
a laser light source configured to emit laser light of at least one hue of red, green and blue;
a spatial light modulator configured to modulate the laser light emitted from the laser light source; and
an optical system configured to guide the laser light emitted from the laser light source to the spatial light modulator,
wherein the laser light source includes the wavelength conversion laser light source according to claim 1.

* * * * *